United States Patent [19]
Chazelle et al.

[11] Patent Number: 5,488,563
[45] Date of Patent: Jan. 30, 1996

[54] METHOD AND DEVICE FOR PREVENTING COLLISIONS WITH THE GROUND FOR AN AIRCRAFT

[75] Inventors: Xavier Chazelle, Saint-Cloud; Anne-Marie Hunot, Paris; Gérard Lepere, Aubervilliers, all of France

[73] Assignee: Dassault Electronique, Saint Cloud, France

[21] Appl. No.: 41,870

[22] Filed: Apr. 2, 1993

[30] Foreign Application Priority Data

Apr. 7, 1992 [FR] France ................................. 92 04245

[51] Int. Cl.$^6$ ................................................. G08G 5/04
[52] U.S. Cl. ................................. 364/461; 340/970
[58] Field of Search .................................. 364/461, 449, 364/456, 434, 433; 340/963, 967, 970; 342/64, 65, 29; 395/600

[56] References Cited

U.S. PATENT DOCUMENTS

| | | | |
|---|---|---|---|
| 4,224,669 | 9/1980 | Brame | 364/433 |
| 4,484,192 | 11/1984 | Seitz et al. | 340/995 |
| 4,646,244 | 2/1987 | Bateman et al. | 364/461 |
| 4,924,401 | 5/1990 | Bice et al. | 364/433 |
| 5,086,396 | 2/1992 | Waruszewski, Jr. | 364/454 |
| 5,140,532 | 8/1992 | Beckwith, Jr. et al. | 395/101 |
| 5,285,391 | 2/1994 | Smith, Jr. et al. | 364/443 |
| 5,414,631 | 5/1995 | Denoize et al. | 364/461 |

FOREIGN PATENT DOCUMENTS

| | | |
|---|---|---|
| 2607948 | 6/1988 | France . |
| WO88/00734 | 1/1988 | WIPO . |

OTHER PUBLICATIONS

1989 IEEE International Conference on Systems, Man, and Cybernetics 14 Nov. 1989, Man, and Cybernetics, Gorder et al.

IEEE 1982 National Aerospace and Electronics Conference, 18 May 1982, Wendl et al.

Primary Examiner—Michael Zanelli
Attorney, Agent, or Firm—Nixon & Vanderhye

[57] ABSTRACT

A mass memory stores a data base representing at least a substantial part of the terrestrial globe, in accordance with a grid configuration on several levels, said grid configuration being in particular more precise in the vicinity of an airport. Status indications are received representing the position of the aircraft with two horizontal components, and the altitude, and the velocity and acceleration vectors of the aircraft, as well as control indications coming from the flight deck. In accordance with the horizontal components of the position of the aircraft, a temporary local map is transferred into a fast access memory, on the basis of which map, an altitude envelope of the terrain is established in the zone where the aircraft is travelling. Anticollision processing make it possible to establish an alarm if the relation between a protection field and the altitude envelope meets a first condition which is defined at least partly by the control indications. The device has application as an aid for aerial navigation.

26 Claims, 21 Drawing Sheets

(M1,N1)　　altitude = $Z_1$　　　　$\Delta_Z = Z_2 - Z_1$
(M2,N2)　　altitude = $Z_2$

FIG. 7 - BLOCK MN
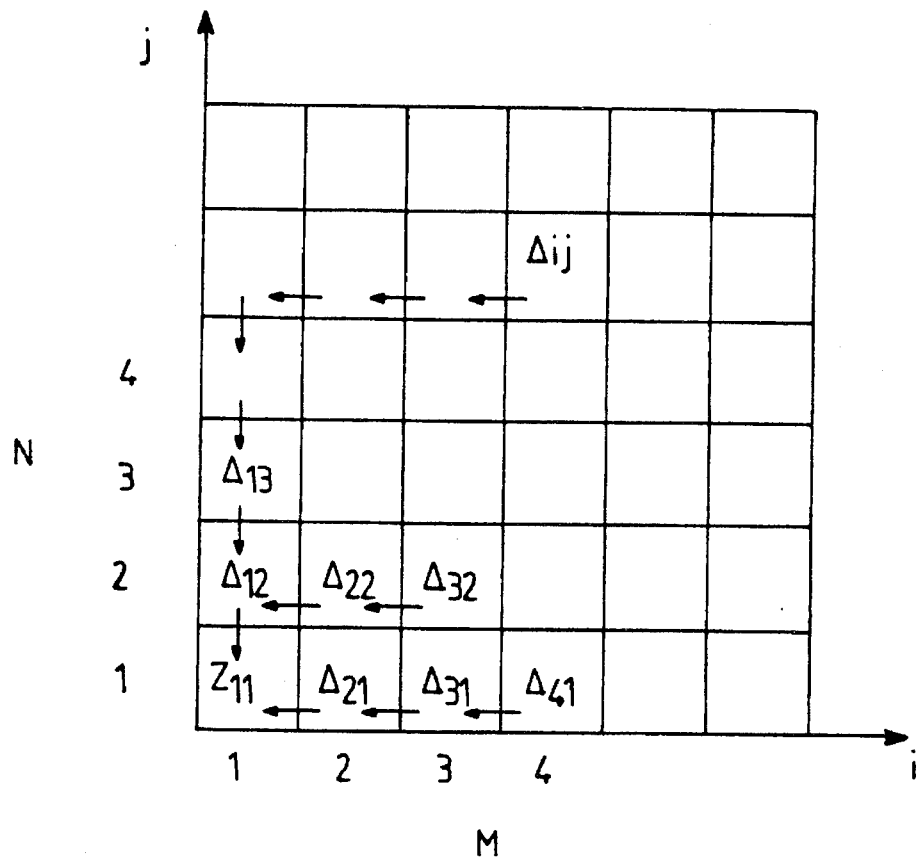
FIG. 8
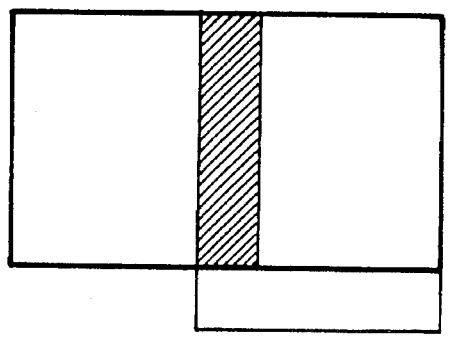
FIG. 9
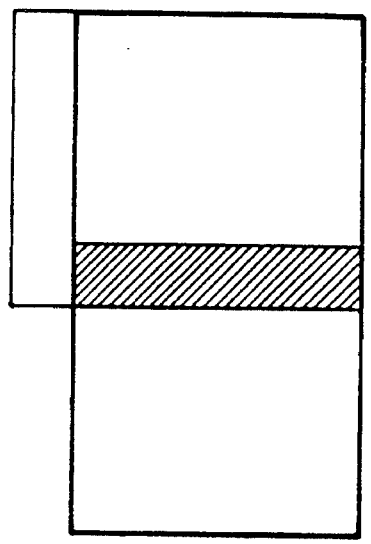

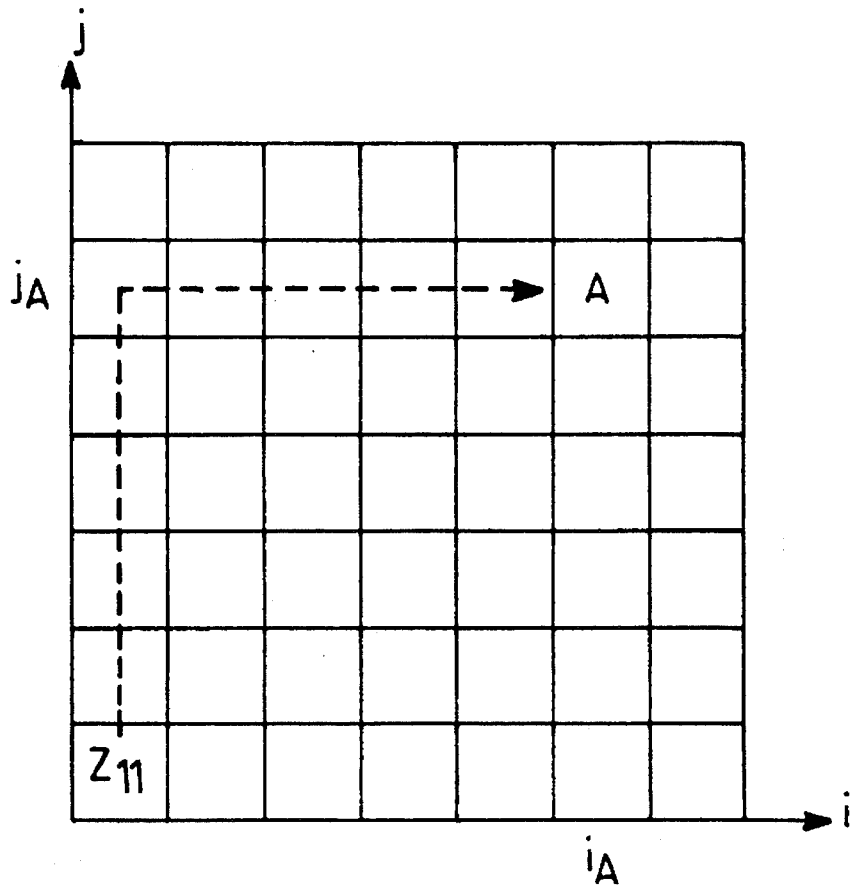
FIG.10a - $Z_A$ FROM ITS BLOCK
$i \epsilon [I]$
$j \epsilon [J]$
$$Z_A = Z_{11} + \sum_{j=2}^{j_A} \Delta_{1j} + \sum_{i=2}^{i_A} \Delta_{ij_A}$$

FIG. 10b - $Z_A$ FROM $\rightarrow$ M,N+1
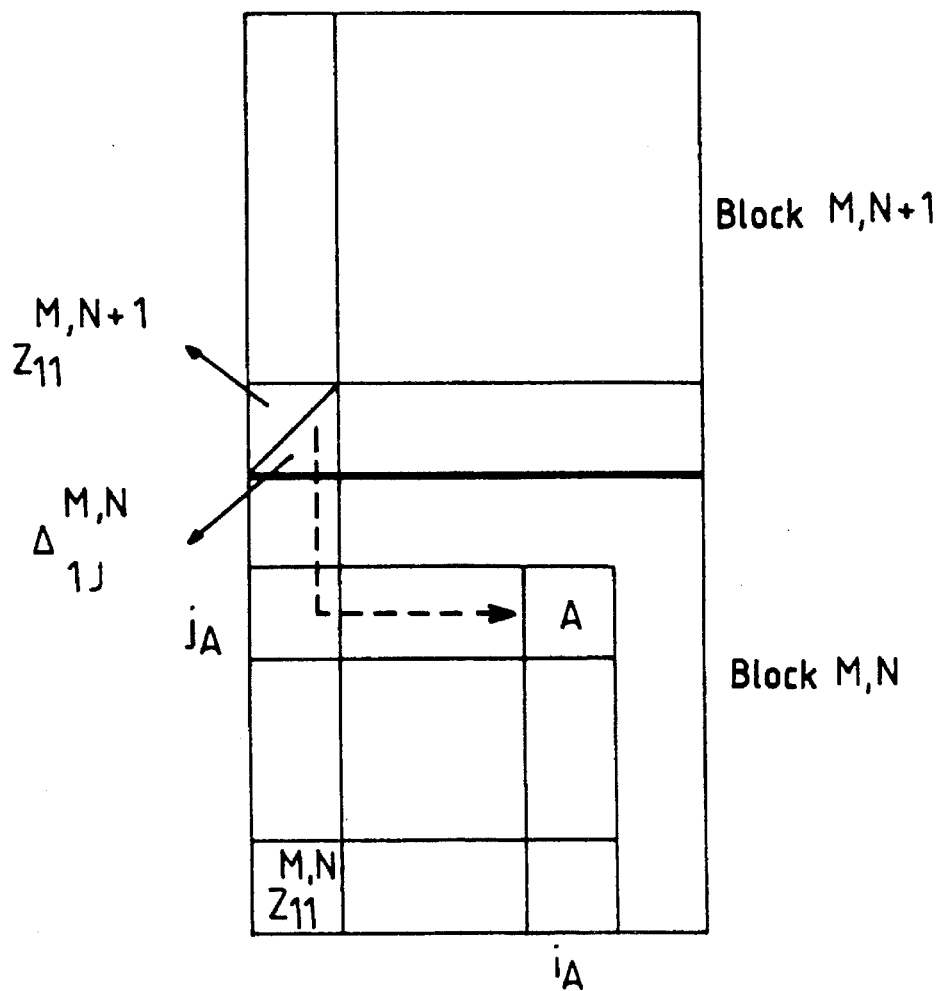
$$Z_A = Z_{11}^{M,N+1} - \sum_{j=j_A+1}^{J} \Delta_{ij}^{MN} + \sum_{i=2}^{i_A} \Delta_{ij_A}^{MN}$$

FIG.10C - $Z_A$ FROM → M+1,N
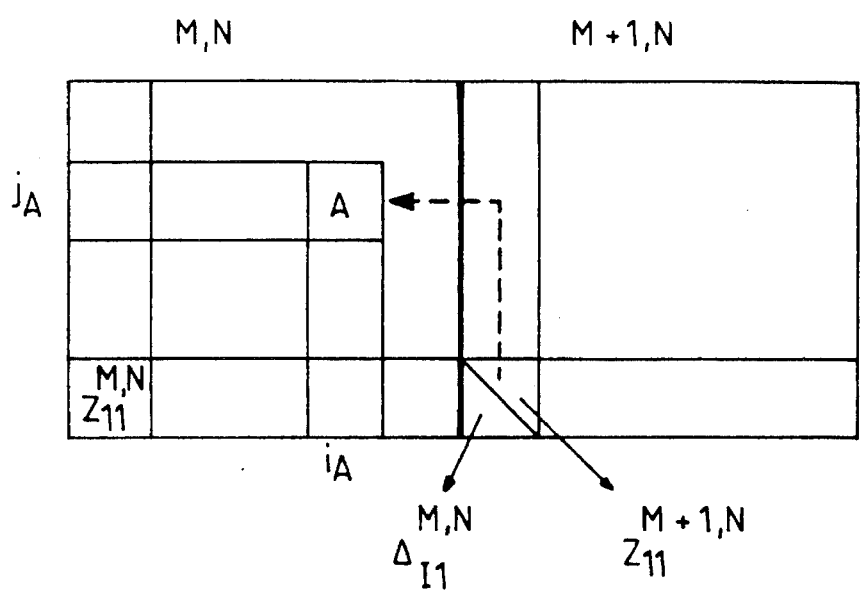
$$Z_A = Z_{11}^{M,N+1} + \sum_{j=2}^{j_A} \Delta_{1j}^{M,N+1} - \sum_{i=i_A+1}^{I} \Delta_{ij_A}^{MN}$$

- $Z_{11}^{M,N+1} = Z_{11}^{M,N} + \sum_{j=2}^{J} \Delta_{1j}^{M,N}$

- $\forall i \in \{2....I\}$ $\Delta_{i1}^{M,N+1} = \Delta_{iJ}^{M,N}$

- $Z_{11}^{M+1,N} = Z_{11}^{M,N} + \sum_{i=2}^{I} \Delta_{i1}^{M,N}$

- $\forall j \in \{2,....J\}$ $\Delta_{1j}^{M+1,N} = \Delta_{Ij}^{M,N}$

FIG. 13 - MARGINS OF UNCERTAINTY
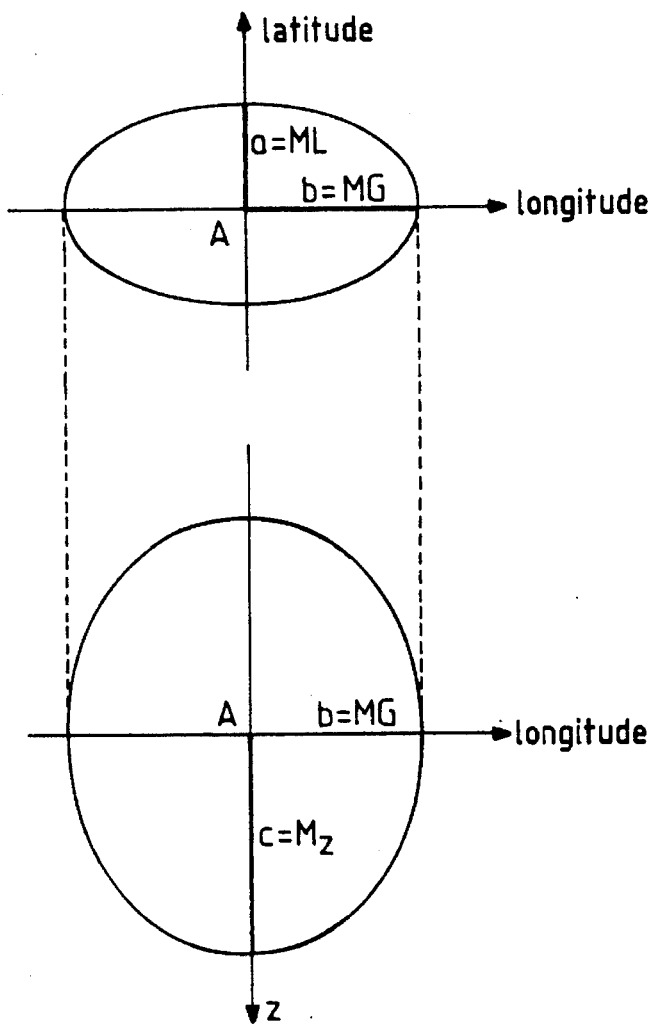
FIG. 14 - UNCERTAINTY LINKED TO THE FLIGHT PATH OF THE AIRCRAFT
(PROJECTION IN THE HORIZONTAL PLANE)
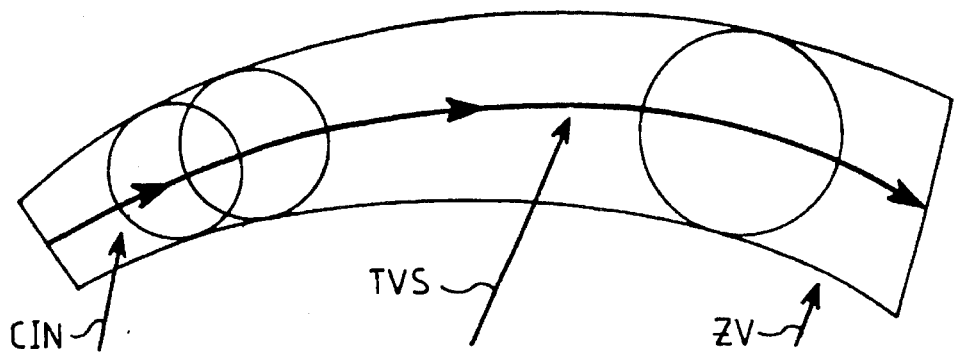

FIG.15a - PREDICTED FLIGHT PATH (HORIZONTAL PLANE)
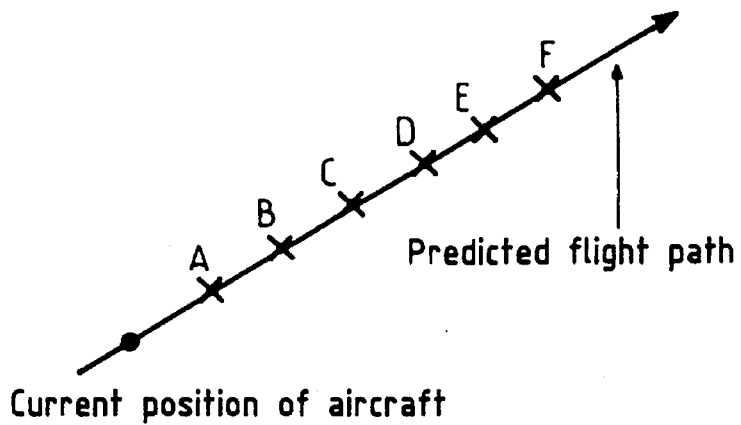
FIG.15b - SAFETY MODEL SAMPLED BENEATH THE PREDICTED FLIGHT PATH
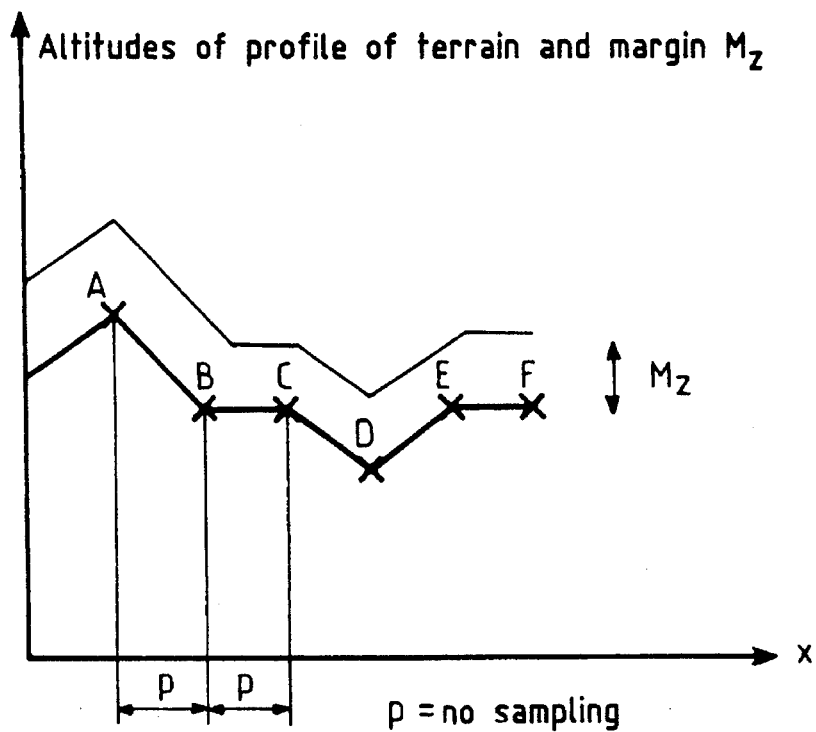

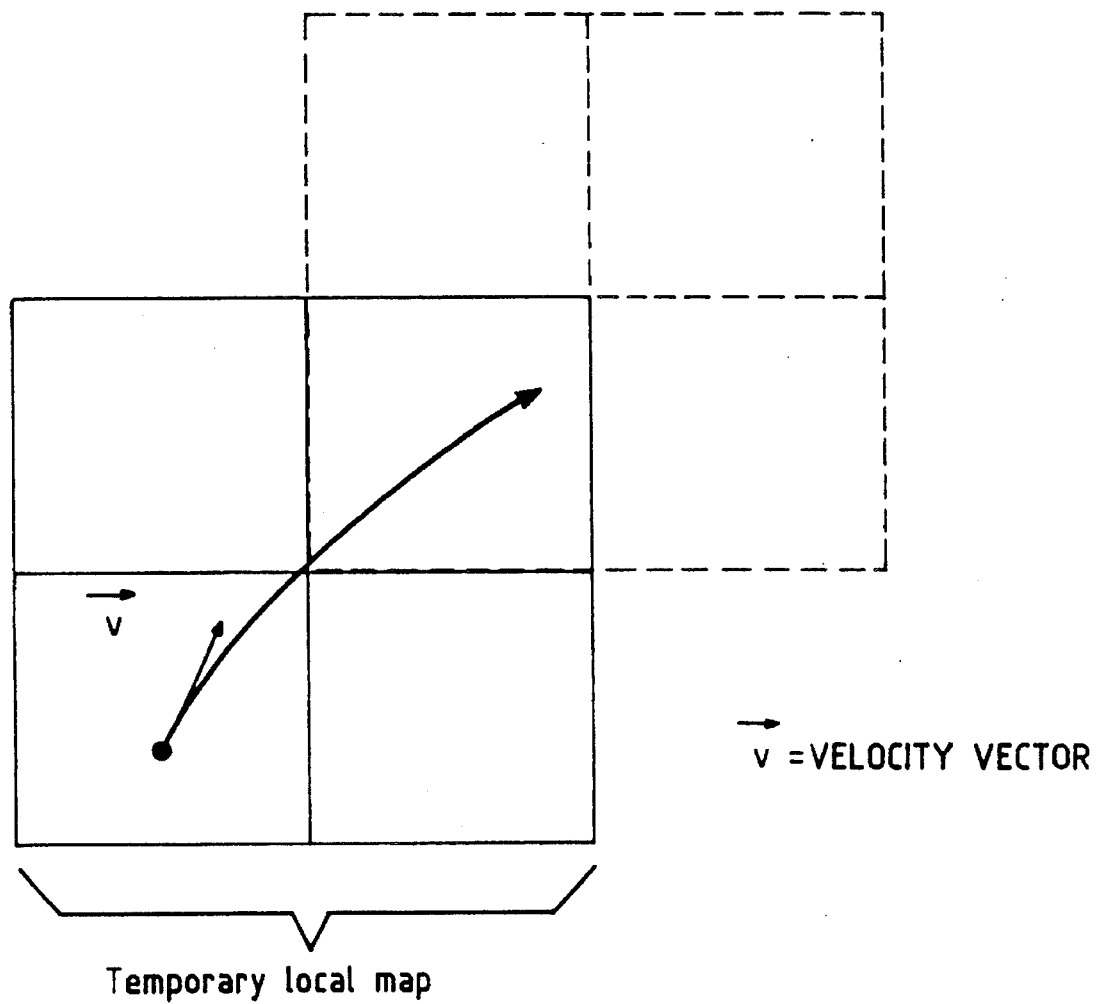

FIG. 17a - ANTICOLLISION LAW
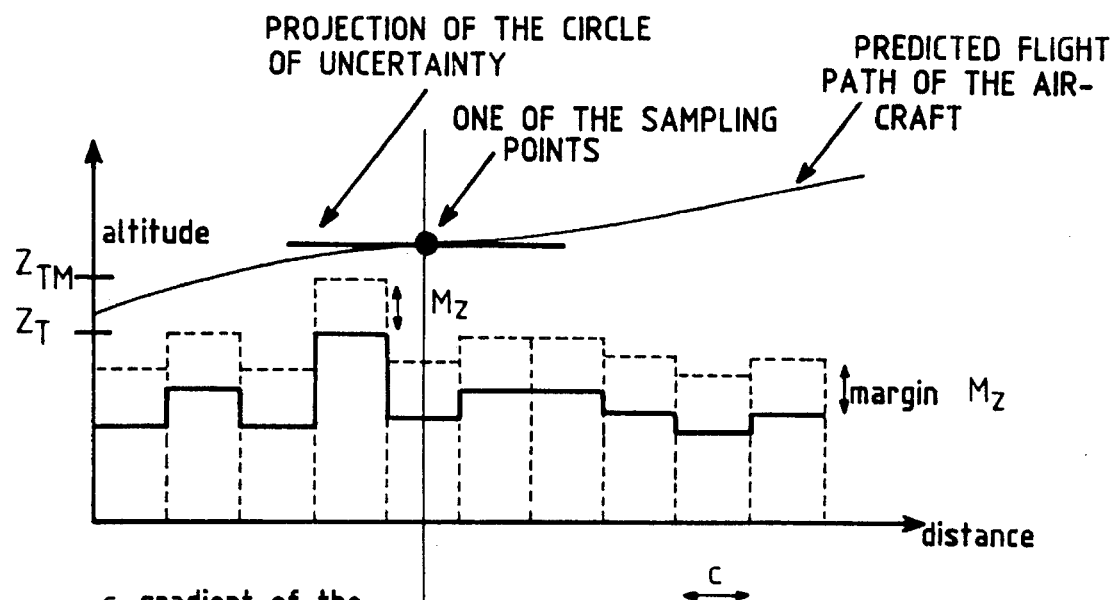
FIG. 17b
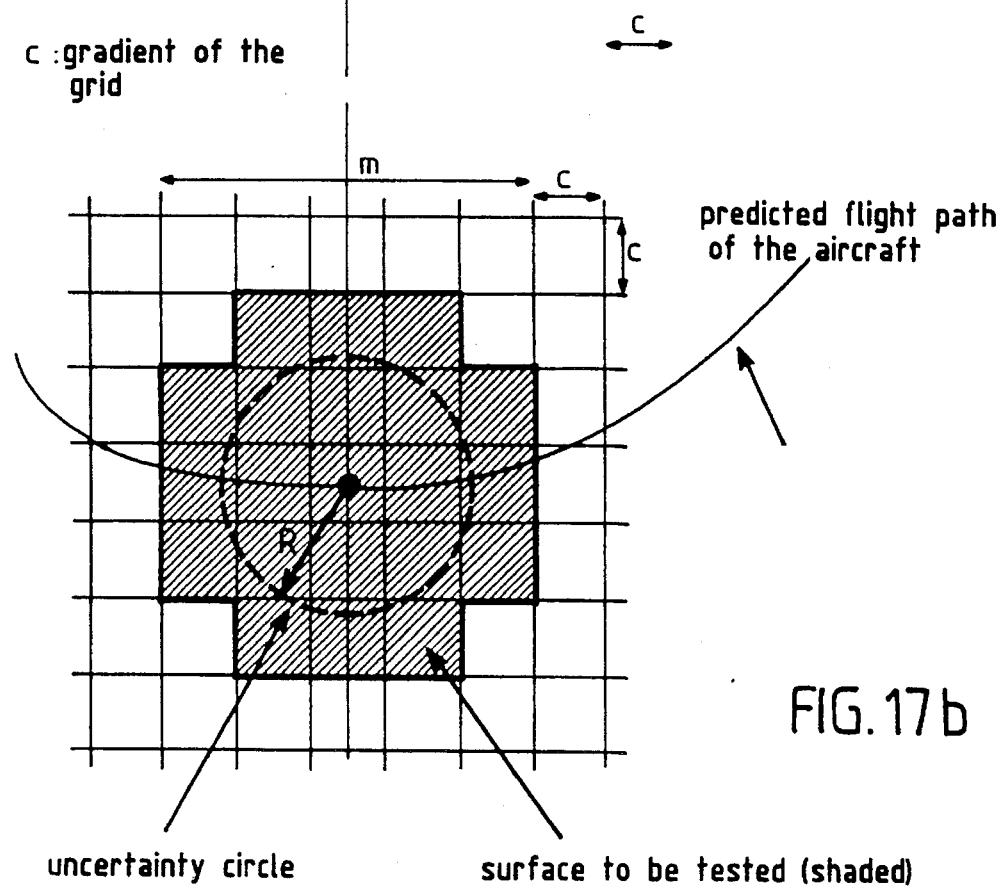

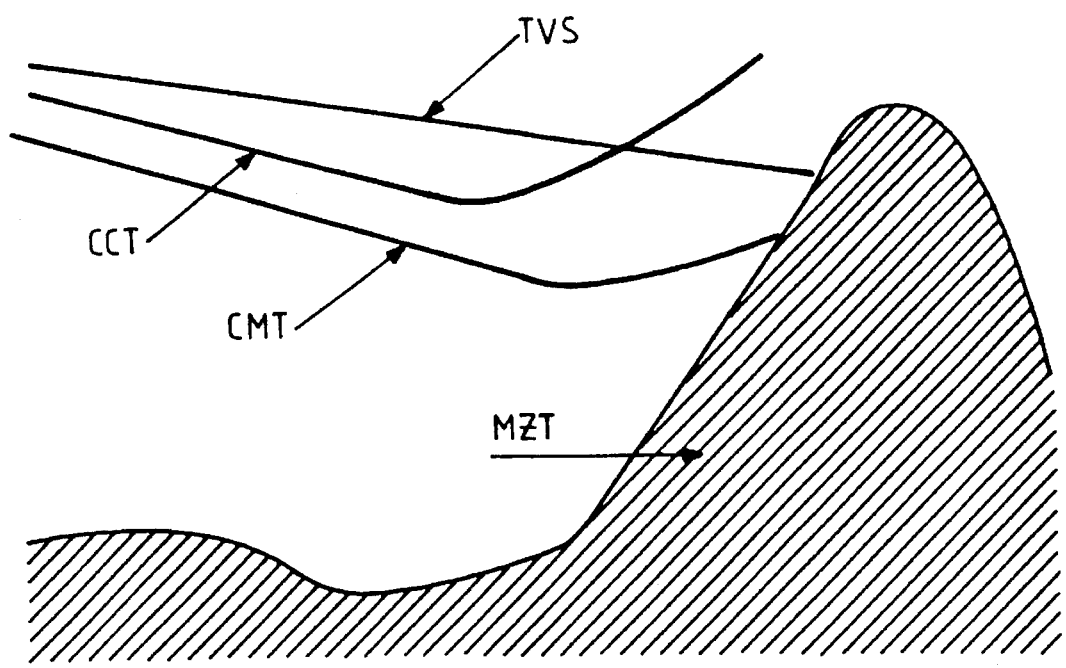
FIG. 18 - PROTECTION CURVES

EXAMPLE OF ABSENCE OF FALSE ALARM

EXAMPLE OF PERTINENT ALARM

FIG. 21 – AVOIDANCE FLIGHT PATH (vertical plane)
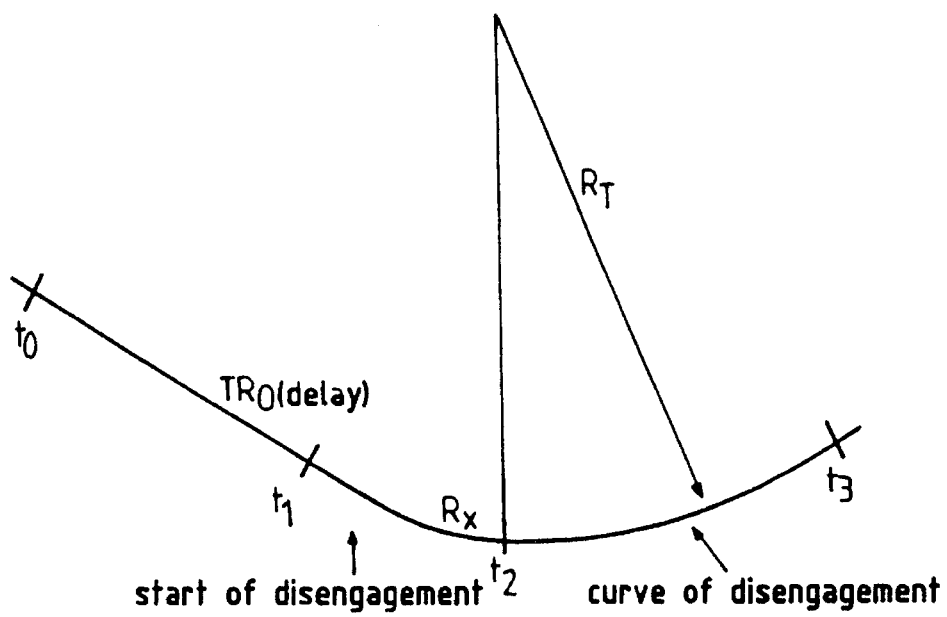
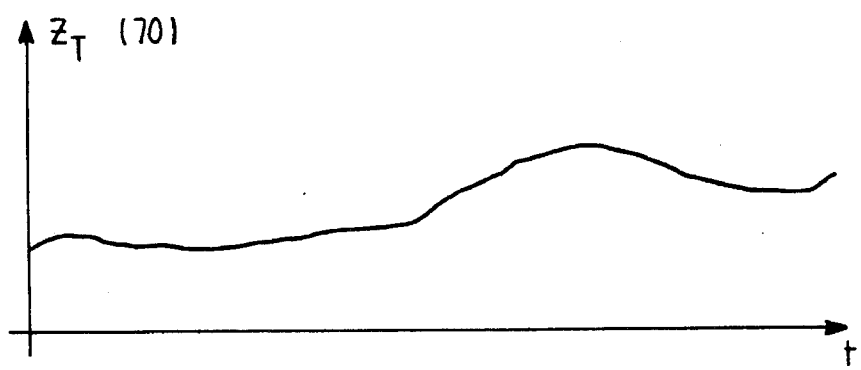
FIG. 22A
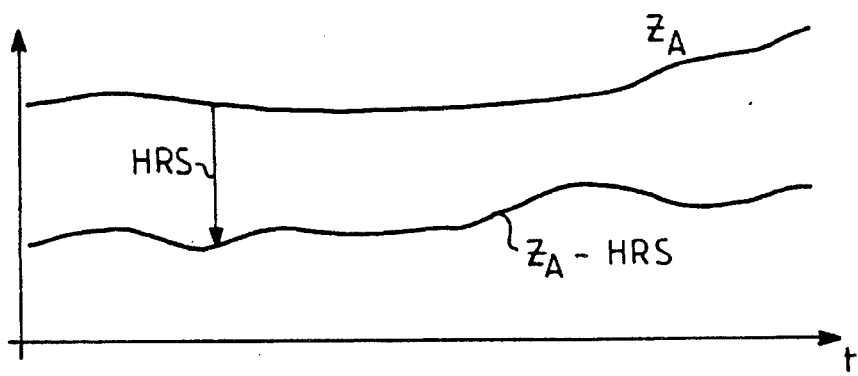
FIG. 22B

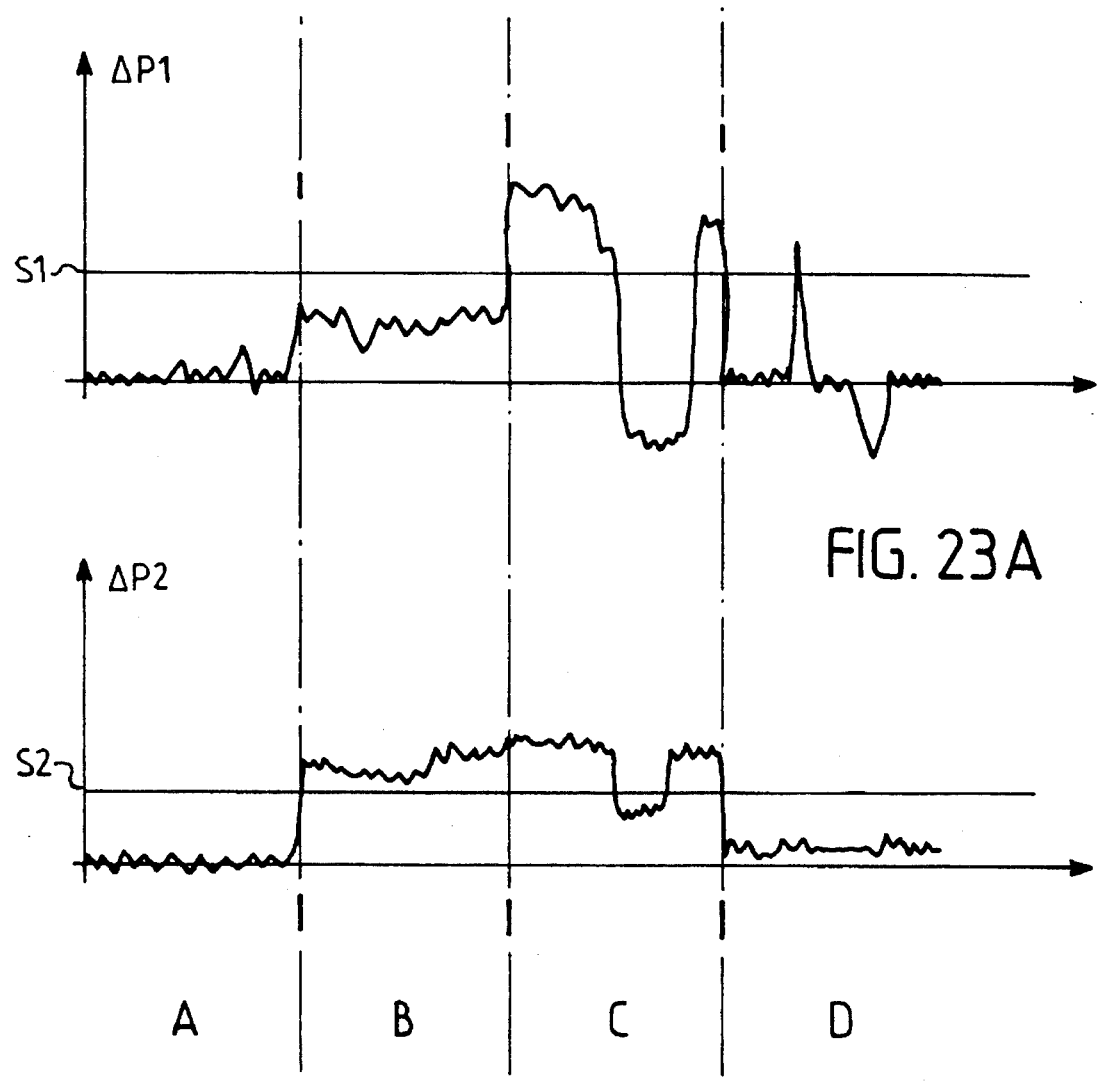

METHOD AND DEVICE FOR PREVENTING COLLISIONS WITH THE GROUND FOR AN AIRCRAFT

FIELD OF THE INVENTION

The invention concerns the general field of aids for aerial navigation.

These aids include in particular means making it possible for the aircraft crew to know its position and means intended to establish its altitude relative to the ground.

PRIOR ART

The majority of aircraft are now equipped with an inertial unit which allows them to determine their position after any interval from take-off. The inertial unit provides the components of the velocity and acceleration vectors of the aircraft as well as the components of the associated angles. It is possible to derive position data therefrom but with a certain drift.

The position data thus obtained may be compared with those provided by other radio navigational means. For example, measurements of the type of system called "Global Positioning System" or GPS are used with Kalman's filtering. This may finally give fairly precise position data of latitude and longitude. The drift is more important for the altitude.

Measuring the altitude of the aircraft is, in fact, more difficult. The altitude relative to sea level is known by measurement means called "baro-inertial means"; but they are dependent on periodical resetting.

Apart from this, a radio altimeter gives the height of the aircraft relative to the ground, or the "radio-altimeter height"; but this is an instantaneous local value: its characteristics depend on the attitude of the aircraft, since the latter affects the way the beam from the radio-altimeter strikes the ground. Moreover, from such a value one cannot predict the future progress.

These measurements are sufficient during the cruising stage of the flight, at least if one is certain that the aircraft is progressing at a high altitude.

In any case, a problem does arise during the approach preliminary to landing, as well as after take-off: in these two cases, the aircraft is necessarily close to the ground, which implies an aggravated risk of ground impact. To deal with these particular difficulties relating to landing and take-off, it has been proposed to rely on ground proximity warning systems, with the acronym of GPWS (not to be confused with the positioning systems termed GPS).

These GPWS systems offer some progress but are not altogether satisfactory.

OBJECTS OF THE INVENTION

It is a primary object of the present invention to provide another solution to this problem from a radically different approach.

It is a further general object of the invention to permit the aircraft to avoid collision with the ground over which it is flying, in all hazardous circumstances.

More precisely it is a first main object of the invention to make it possible to ensure that the aircraft is at no time in an immediately dangerous position in relation to the ground. It is a subsidiary object to provide means for checking that the short-term flight path of the aircraft does not lead it into a dangerous position relative to the ground.

A second main object of the invention is to provide for this purpose an on-board device which is not sensitive to the prevailing meteorological conditions but is capable of functioning on a continuous basis and which is, in operation, independent of the information, control and safety systems installed on the ground.

A third main object of the invention is to propose to the pilot an avoidance manoeuvre in the case of a dangerous situation and possibly to automate such a manoeuvre in certain cases.

It is also an object of the invention to provide the pilot with a synthetic image of the terrain at a visibility distance in real time.

The invention also has the object of improving the ergonomics and safety of piloting an aircraft.

Another important object of the invention is to permit a regular updating or resetting of a terrain file from data acquired by a group of aircraft equipped according to the invention.

SUMMARY OF THE INVENTION

According to a first aspect of the invention, there is provided a device which includes a mass memory capable of storing a data base representing at least a substantial part of the terrestrial globe, in a cutout form comprising a grid configuration on at least one level. Advantageously, this grid configuration includes basic grids, intermediate grids subdividing certain basic grids and ultimate grids subdividing in turn some of the intermediate grids. These intermediate and ultimate grids are provided at least in the vicinity of airport zones.

Each grid is associated with at least one data item representing the maximum altitude inside the grid. Provision is, moreover made for a reading means by means of at least one index permitting rapid access to sets of contiguous grids contained in the said data base, in accordance with a system of addressing horizontal coordinates, such as latitude and longitude.

The device also includes an input for receiving status indications, expressed for example in geographical coordinates, and including in particular the latitude, longitude, altitude, and the velocity and acceleration vectors of the aircraft, optionally with the associated angles. At the input, there are also received the control indications coming from the flight deck.

The data base is managed by electronic means. In accordance with the said status indications they will extract and transfer data constituting a temporary local map (a geographical map) into a fast access memory. This map defines an altitude envelope of the terrain in the zone where the aircraft is progressing.

Finally, processing means will process the said status data so as to estimate a plurality of predicted points of the flight path of the aircraft; at each point, they will compare the contour of a protection field around the aircraft with the altitude envelope in the corresponding portion of the said local map; an alarm is established if the relation between the protection field and the altitude envelope meets a chosen condition (an anti-collision law). Preferably, this condition is defined, at least partly, by means of an altitude safety margin and/or other control indications coming from the flight deck.

In particular, the anti-collision law expresses the fact that the vertical distance between the protection field and the altitude envelope remains at least equal to the altitude safety margin for the predicted points of the flight path of the aircraft. Provision may be made for more elaborate conditions.

According to another aspect of the invention, the processing means are also arranged so as to emit a preliminary alarm indicating a risk of collision with the ground in the medium term, according to at least one anti-collision law of the ground (anti-ground impact law), specific to aircraft. This law may take account of the fact that the aircraft is flying in a straight line or in a turn.

Preferably, the means for managing the data base use a change in the points of reference in the zones surrounding the terrestrial poles. They also associate with the grids a dimension depending on the latitude in the direction of the terrestrial parallels.

Very advantageously, the grids are gathered into blocks or slabs, each block being associated with a reference altitude data item expressed as an absolute value, while the maximum altitude in each grid is expressed as a relative value in relation to an adjoining grid in accordance with a predetermined rule for passing through the grids within one block. Preferably, each block has an overlap of at least one basic grid on two adjacent sides with its neighbors.

According to another aspect of the invention, the device includes means for displaying a synthetic image of the terrain in accordance with the contents of the local memory.

A particularly advantageous aspect of the invention will now be dealt with. In flight, the device includes means for comparing the terrain defined by the local memory with the terrain defined by the on-board instruments. The result of this comparison may be displayed and/or used to validate the operation of the device. Moreover, provision is made for means to store the divergences noted during the said comparison. After suitable cross-checks, these stored divergences will serve to update the basic terrain file maintained on the ground.

The invention also provides a method for aiding the navigation of an aircraft. This method is subject to the same variants as is the device described above.

BRIEF DESCRIPTION OF THE INVENTION

Other objects and advantages of the invention will emerge on examining the detailed description given below and the attached drawings wherein:

FIG. 7 shows the gathering of the grids into blocks;

FIGS. 8 and 9 show an overlapping of the blocks;

FIGS. 10a, 10b and 10c show different ways of calculating an absolute altitude from the data stored in the memory for the blocks;

FIG. 13 illustrates an uncertainty range;

FIG. 14 illustrates the uncertainty related to the flight path of the aircraft;

Figure 19:
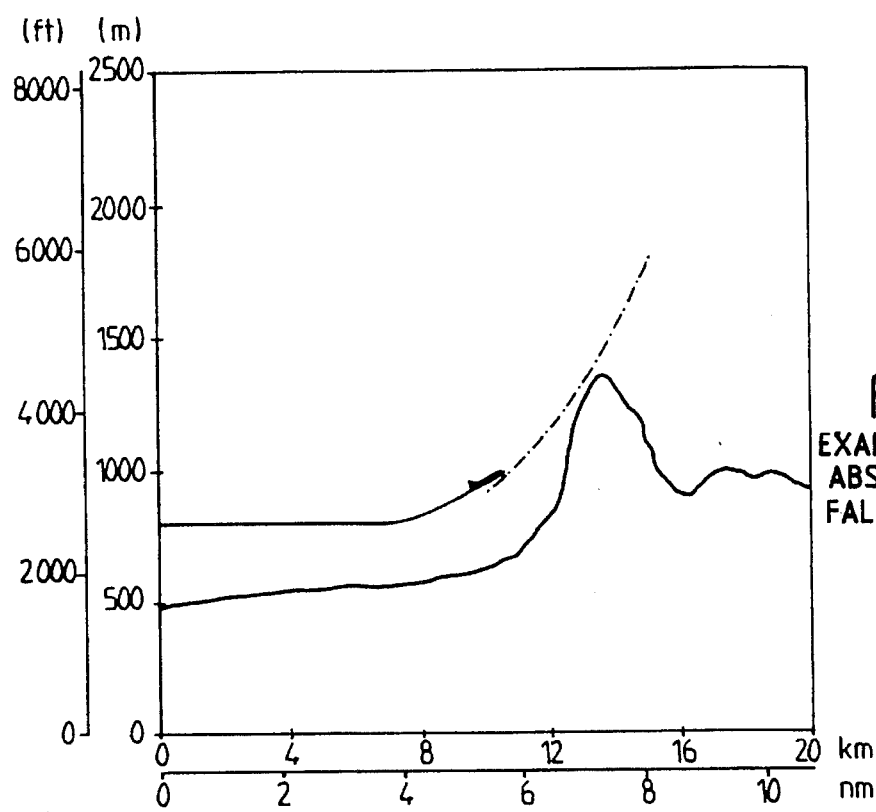
Figure 20:
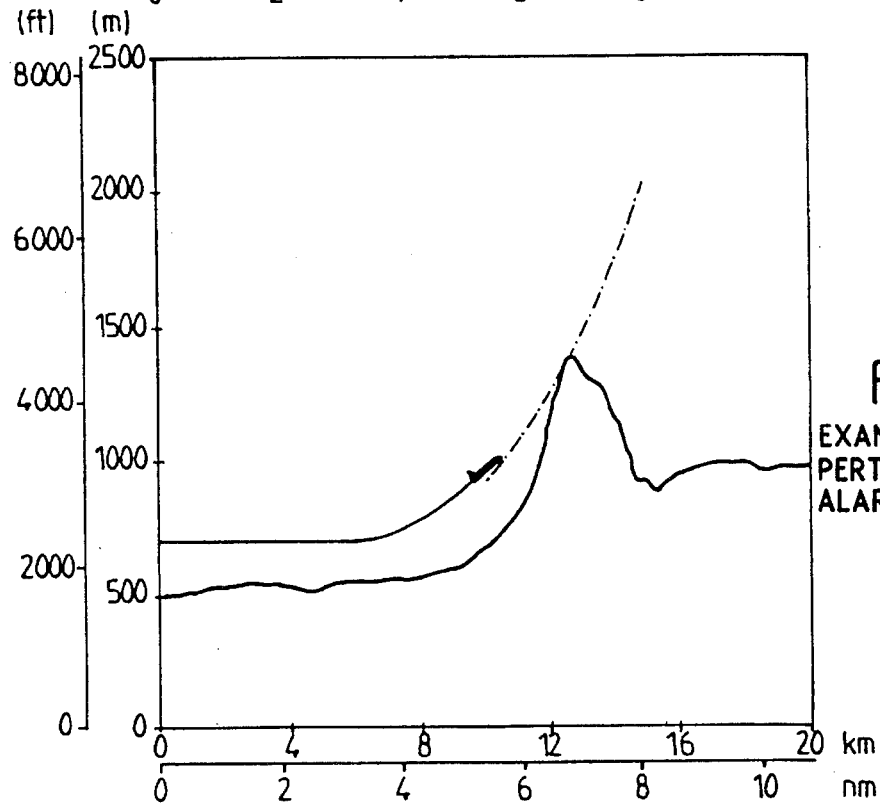
Figure 24:
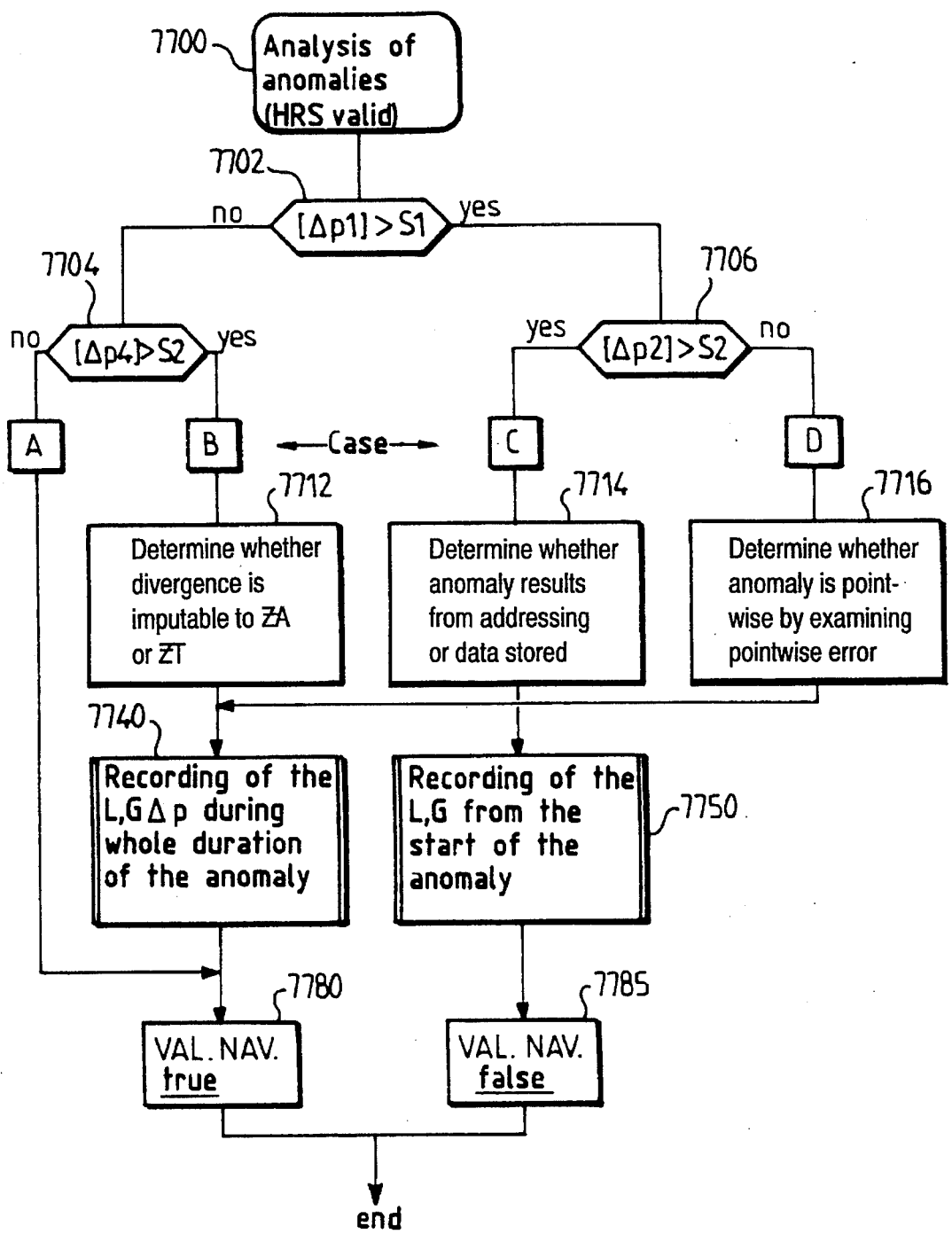

FIGS. 15A and 15B respectively illustrate a predicted flight path and an altitude profile coupled with a margin corresponding thereto;

FIG. 16 schematically outlines the progress of the position of an aircraft in relation to a map contained in a local memory;

FIGS. 17A and 17B illustrate the determination of the relation between the position of the aircraft and the contents of the local memory;

FIG. 18 illustrates an example of an anti-collision protection curve;

FIGS. 19 and 20 are views in a vertical section illustrating different situations relative to an obstacle;

FIG. 21 is an example of an avoidance flight path;

FIGS. 22A and 22B illustrate two curves of the terrain;

FIGS. 23A and 23B illustrate two divergence signals relating to the curves of the terrain of FIGS. 22A and 22B; and FIG. 24 illustrates a mechanism for analyzing these divergence signals.

DESCRIPTION OF THE PREFERRED EMBODIMENT

The attached drawings are in essence of a definitive nature and therefore form an integral part of the present description. They may serve not only to render the latter more readily understood but also to contribute to the definition of the invention if required.

In general in the present description, the expression "flight deck" (or "control station") refers to the functions necessary for the piloting, irrespective as to whether the latter are effected manually or automatically. By functions necessary for the piloting there is to be understood, in particular, the functions of piloting proper and also the navigational functions. On another level one may distinguish between the functions themselves and their man/machine interface.

Reference is made to FIGS. 1 to 4B. The device in accordance with the invention is mainly intended to be installed on board an aircraft. The latter includes equipment 2 capable of providing indications of the flight parameters in the form of electric signals, that is to say, (FIG. 3):

an inertial unit 20 or INU ("certified" equipment), a radio navigational instrument of the GPS type, designated 21, with its antenna ("uncertified" equipment), a radio altimeter 22 with its antenna.

The inertial unit 20 provides the components of the vectors of velocity (V) and acceleration ($\gamma$) of the aircraft. One may deduce therefrom the associated characteristic angles: in particular, the angle of incidence, yaw, slope, pitch, heading, bank. However, inasmuch as the inertial unit measures and/or uses certain of these angles for determining the velocity and acceleration vectors, it is preferable to collect the values of the said angles directly from the inertial unit, where it is used for operating the invention. These angular values may be displayed and/or used in the vicinity of the flight deck.

For the altitude, the inertial unit cooperates in the known way with a barometric altimeter (not shown).

The following notations will be defined below:

Zb is the barometric altitude given by the measurement of the atmospheric pressure, and varies according to the altitude and the meteorological conditions, Zi is the inertial altitude calculated by the double integration of the vertical acceleration measured by the accelerometers of the inertial unit (long-term variations), Zbi is the baro-inertial altitude, that is to say, Zb filtered by Zi (a third order loop, for example), Zc will be the computed altitude (HRS+Zta) where HRS is the radio altimeter height given by the radio altimeter or radio altimeters of the aircraft (accuracy of a few meters), and Zta will be the altitude of the terrain beneath the aircraft given by the terrain file (defined below), Zgps is the altitude provided by the GPS.

Usually, aircraft are provided with an array of inertial units, and with a decision logic taking into account the indications from these units as a whole. For the operation of the invention, the Applicant considers it at present preferable to take these data from only one of these units (to the extent that they are confirmed).

The radio navigational instrument 21 provides uncorrected measurements of the latitude L1, longitude G1 and altitude Z1 (=Zgps) updated at a sequence p1 ranging from a few seconds to a few minutes. By integration of the velocity and acceleration vectors, the inertial unit 20 provides other measurements of the latitude LO, longitude GO and altitude ZO (=Zbi) which are less precise but come from "certified" equipment. A block 25 compares the two types of measurement and validates the values L1, G1, Z1, if they are consistent with LO, GO, ZO. Such validation techniques are known. The validated measurements L2, G2, Z2 are available at the time sequence p1. But they are upgraded from the inertial unit at a time sequence p2 of approximately one second.

A block 28 extrapolates the data between the last instant of measurement by the instrument 21 and the current instant (this extrapolation is useful in particular in the case of problems with the time sequence of providing the data, which may be too slow).

The radio altimeter 22 delivers the height above the ground, designated HRS.

Figure 1:
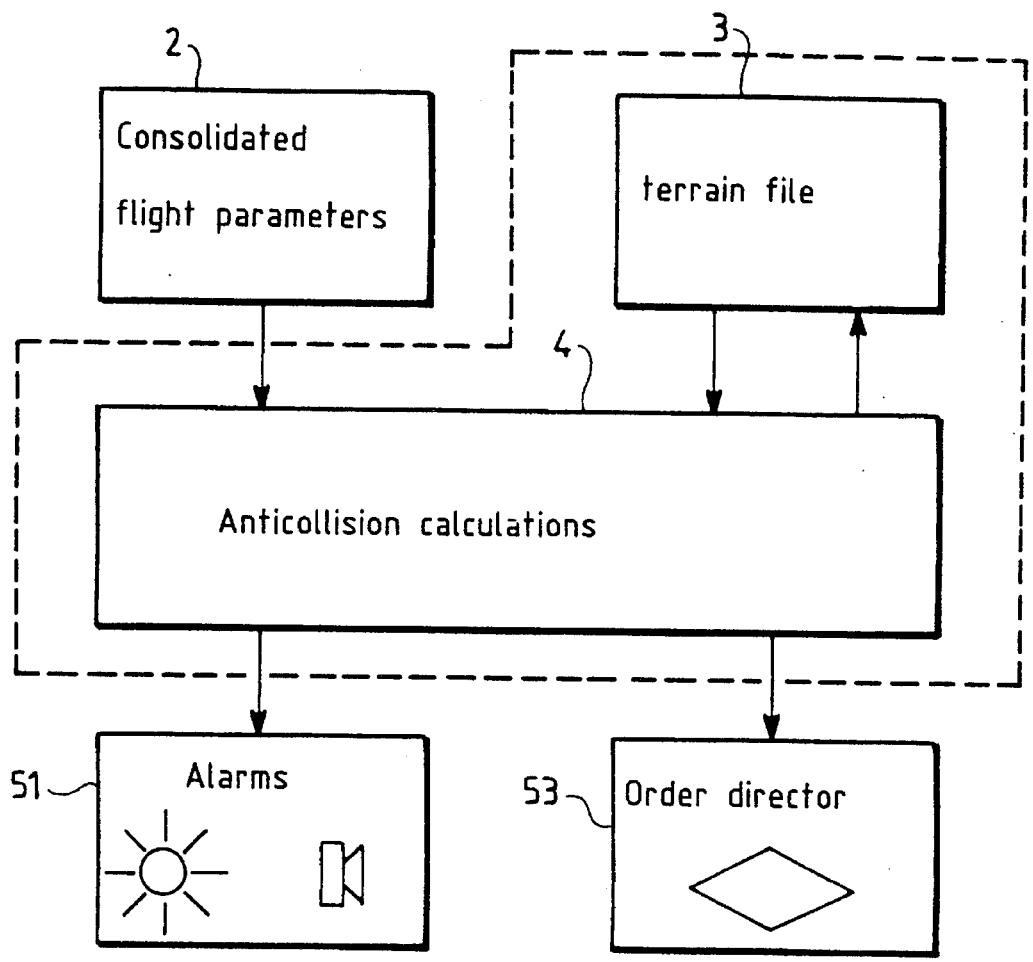
FIG. 1 is a very general schematic diagram of a device in accordance with the invention.
Figure 2:
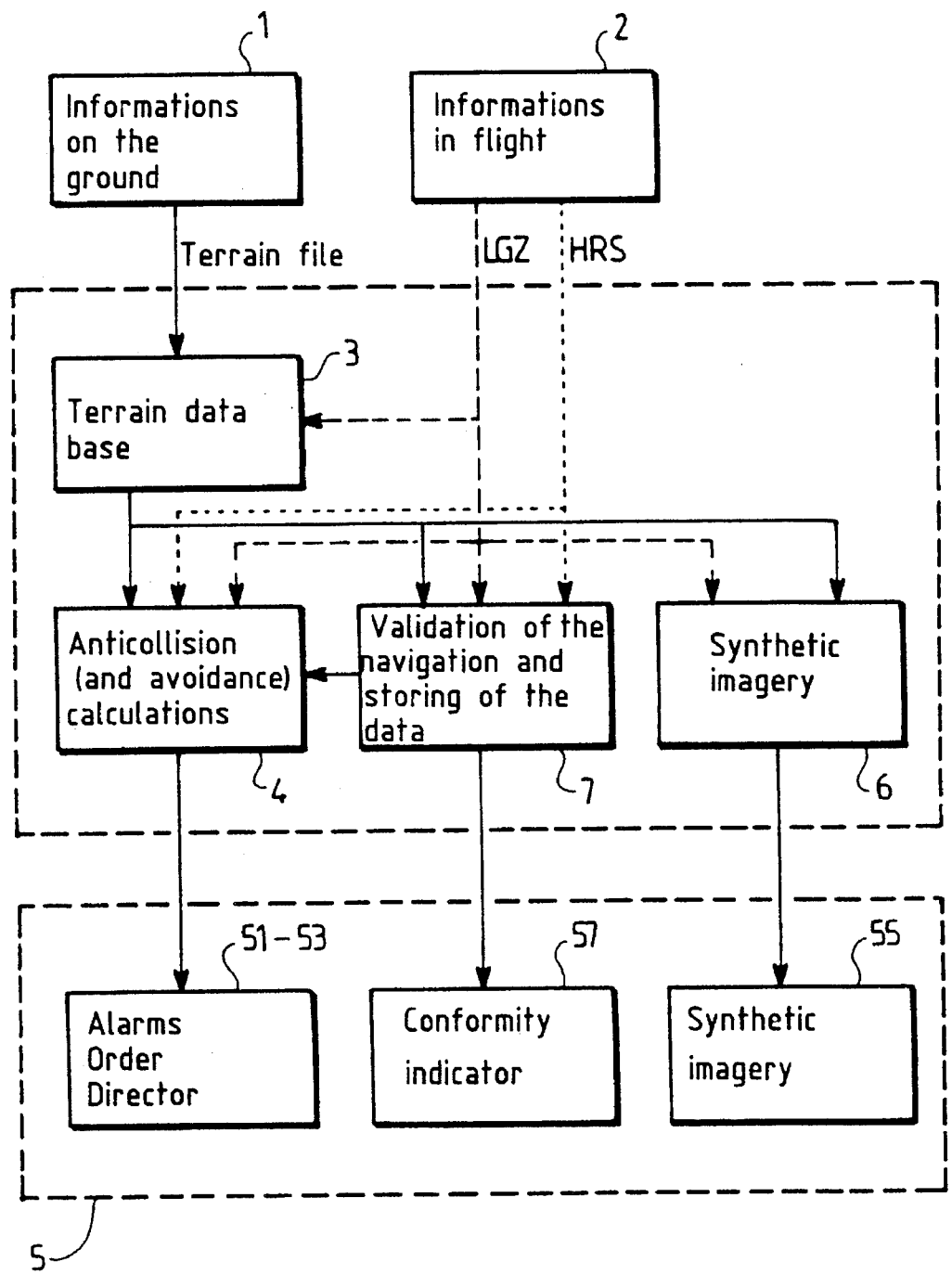
FIG. 2 is a more detailed schematic diagram of a device in accordance with the invention.
Figure 3:
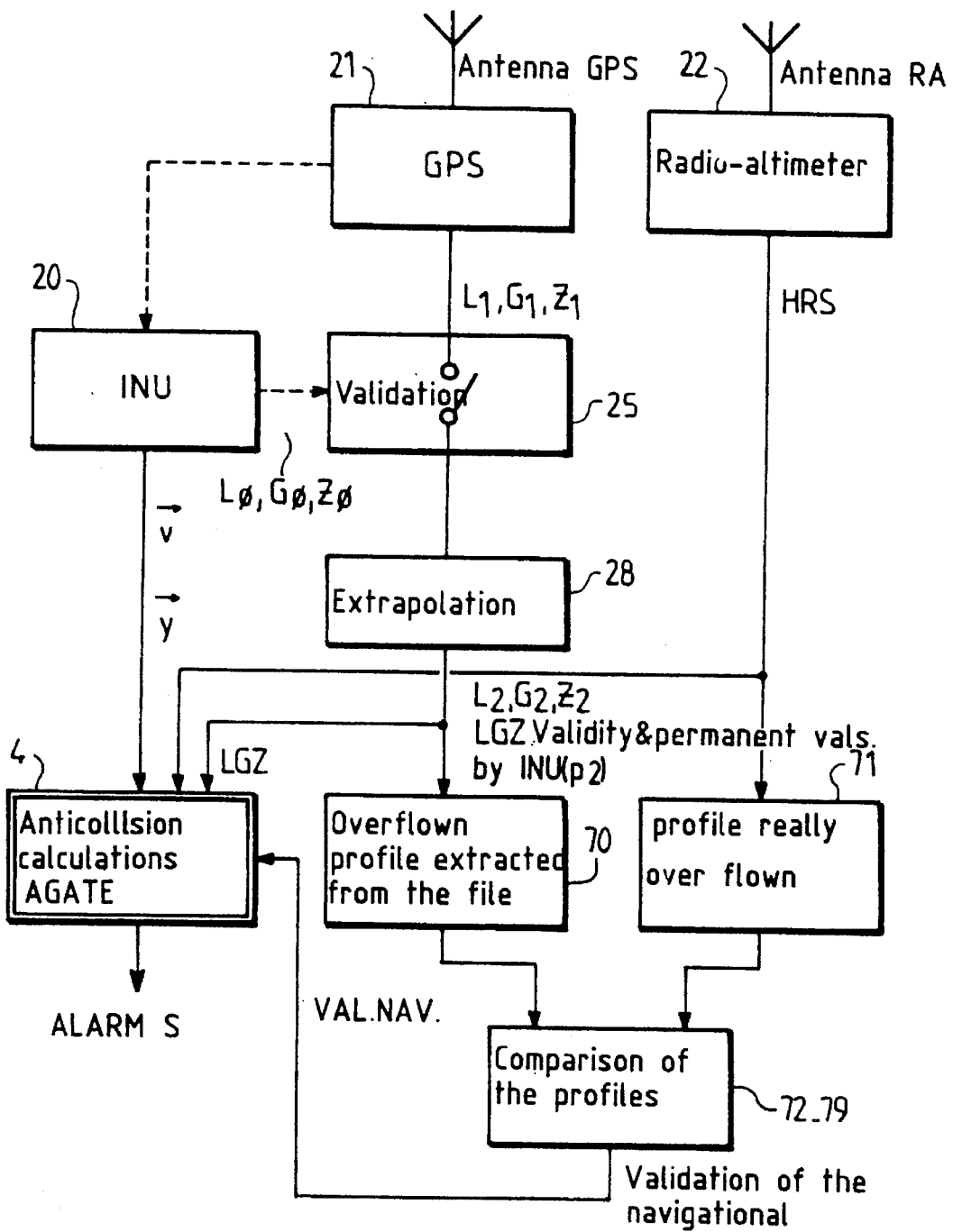
FIG. 3 is a still more detailed schematic, but partial diagram of a device in accordance with the invention.
Figure 4A:
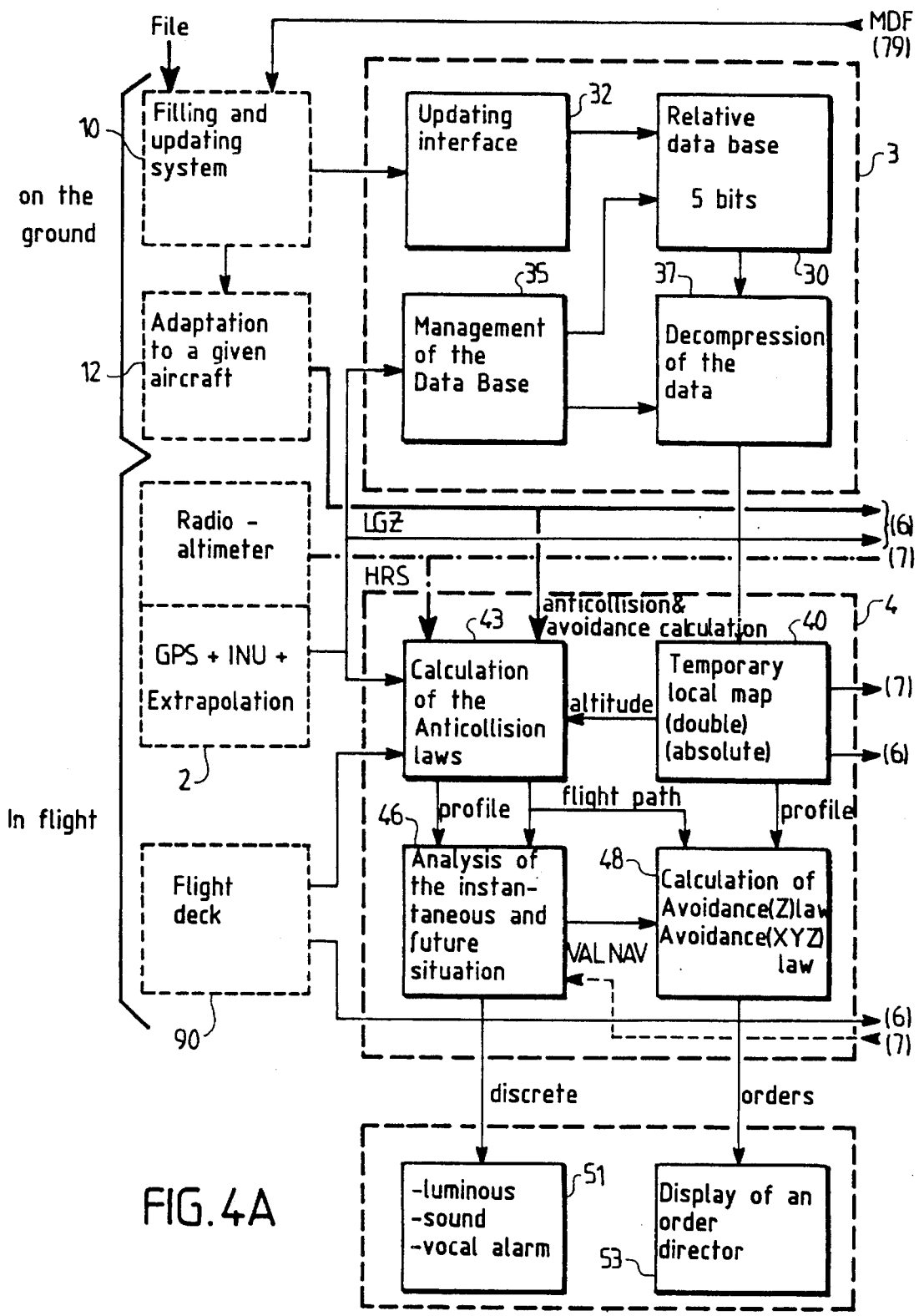
FIGS. 4A and 4B are two other detailed diagrams which, taken together (taking their cross-check into account) define a device in accordance with the invention.
Figure 4B:
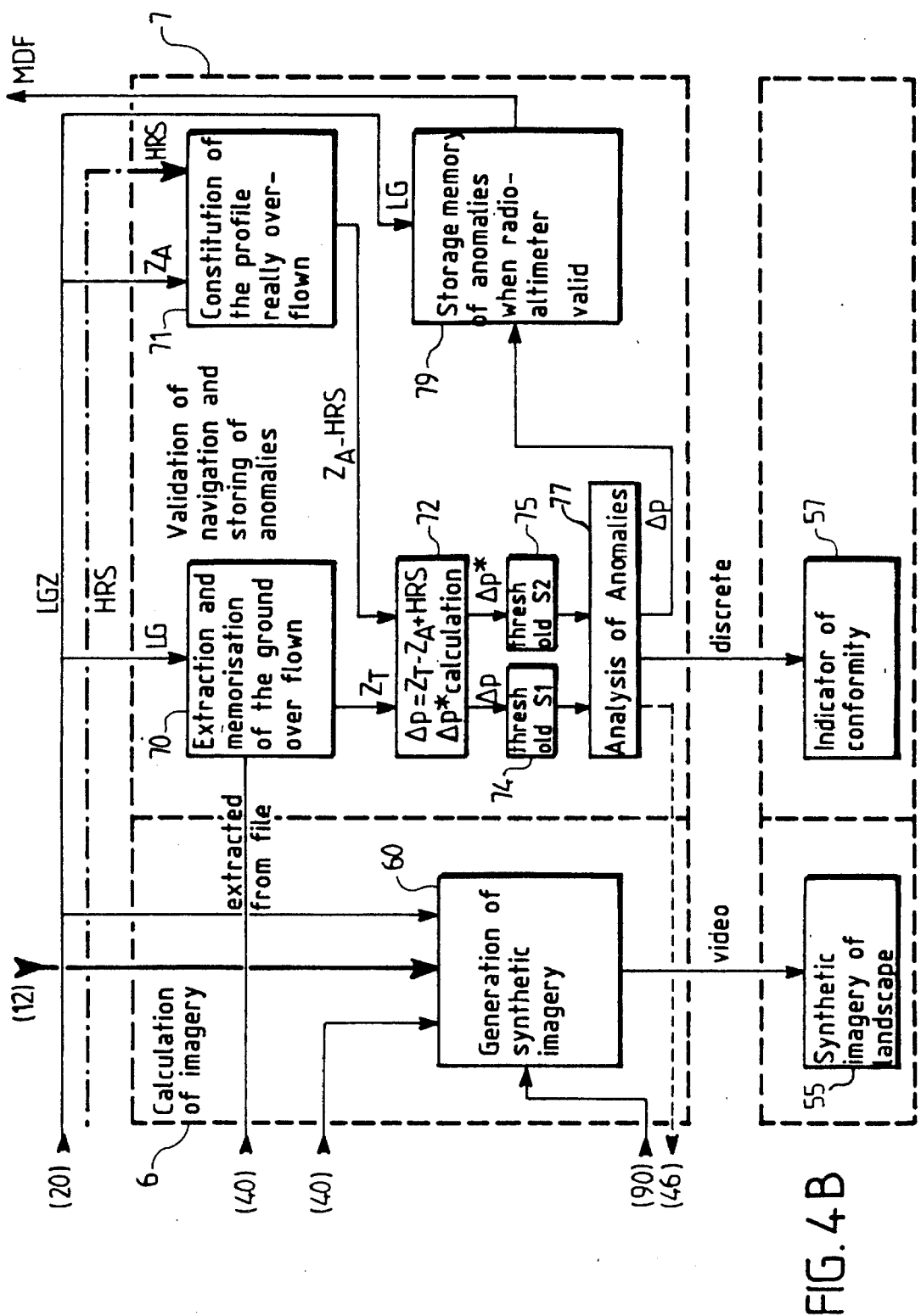

A block 3 contains a terrain file, established in a way that will be described below. In accordance with the values of L and G one gains access to a part of this file, called the local map and stored in a local memory 40 (FIG. 4A).

On the basis of this local map and the values of L, G, Z as well as HRS, the block 4 performs anti-collision calculations, preferably accompanied by ground avoidance calculations.

In the presence of a collision risk, an alarm (51) is emitted. An order director 53 may suggest an avoidance manoeuvre. The destination of this is the flight deck.

The local map may also be used for generating a synthetic image (60) with its visualization device 55.

It will also serve for the functions (7) of validating the navigation and storing the divergence (or difference) data designated MDF.

These divergences are transferred to the bottom of the block 79 to the block 10, then they are sifted and serve for the total or partial updating of the data base 30.

The memory 70 retains the map profile which is flown over according to the sequence of the data L, G, Z. The memory 71 retains the real profile flown over, taken from the height HRS. The divergence between these two profiles is calculated at 72.

More precisely (FIG. 4B), the divergence is compared with two thresholds at 74 and 75 respectively. It is then analyzed (77), hence:

the actuation of a conformity indicator 57 confirming the proper functioning of the device;

the generation of a signal VAL.NAV., to validate the calculations of block 4; and according to other criteria, the storing of the data MDF in a memory 79, in accordance with the values L and G in respect of which they have appeared. These data MDF may then serve as the basis, after the flight, for the updating effected in the system 10 of FIG. 4A.

In practice, the analysis block 77 will effect a correlation of the two inputs, but while taking into account:

the history (recent past) of the flight, the estimated confidence in the data of the radio altimeter (limits of operation, taking into account the attitude of the aircraft, self-monitoring), the transitory nature of the crossing of the threshold, the analysis of the result (bias or noise or other), possibly, adequate stored data.

The present invention requires a preparation on the ground effected at regular intervals.

The functions (3) of processing the terrain file are installed on board the aircraft. They use a mass memory 30 capable of accommodating a terrain data base BDT. With this mass memory 30, there are associated an updating interface 32, a device 35 for managing the data base, as well as a device 37 for the decompression of the data of the base.

On the ground, outside the aircraft, a data processing device 10 ensures filling and updating of the data base 30 through the interface 32 from the data coming from a very detailed electronic terrain file. Preferably, provision is also made on the ground for a block 12 which defines a parameter system for adapting the use of the terrain file to a given aircraft and subsequently transmits these data:

to the anticollision computer 43 for determining the parameters of the anti-collision laws and avoidance laws if applicable, and to the visualization device 60 for adapting the visualization to the dynamic characteristics of the aircraft.

The terrain file on the ground may be regularly updated by means of suitably checked return data MDF.

Since the terrain data included in the data base 30 are compressed, their utilization requires the use of a decompression function which will be described below.

For its part, the block 35 for managing the data base uses at least one index which may be stored in the mass memory 30, so as to permit the identification of, and fast access to, the data contained in the data base BDT.

The flight deck 90 also provides information which includes at least the definition of an altitude safety margin MCZ transmitted to the block 43. Preferably, there is added thereto an "input status word" indicating:

whether the piloting is automatic or manual;

whether the aircraft is in a turn or in a straight line;

the characteristics (in particular the flight characteristics) of the aircraft.

Moreover, the flight deck 90 may define adjustments for the synthetic imagery of the block 60.

One of the essential fundamentals of the present invention is the fact that Applicants have recognized the possibility of storing on board an aircraft a terrain file capable of representing practically the whole of the terrestrial block, within the limits of the contour and resolution suitable for the requirements of an aircraft.

Figure 5:
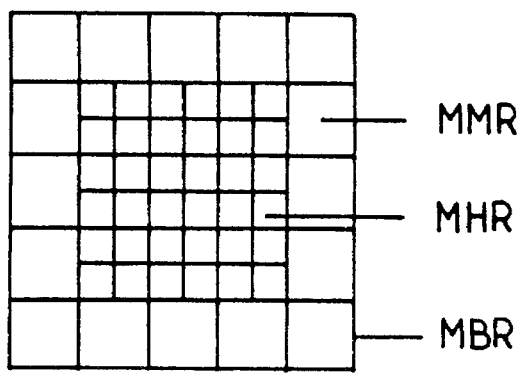
FIG. 5 illustrates the definition of the grids in accordance with the invention.

First of all (FIG. 5), the stored data are defined in low resolution elementary grids MBR which exist for the whole geographicall domain covered by the data base.

In the vicinity of airports, or for other reasons, the MBR grid may be broken down into medium resolution grids MMR which in turn may be broken down (for example, in the immediate vicinity of the airport) into high resolution grids MHR.

Figure 6:
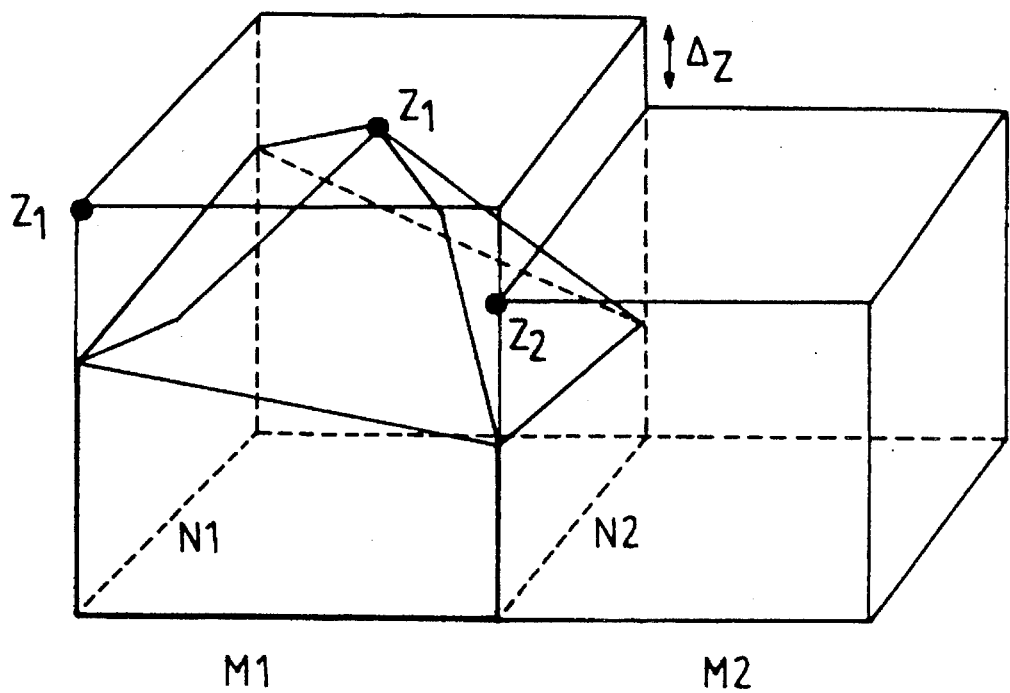
FIG. 6 is a view in perspective showing the relation between two consecutive grids.

FIG. 6 shows that with each grid, irrespective of its resolution, there is associated a digital value representing the altitude of the highest point situated inside the grid (it is recalled that the file on the ground is much more detailed).

Another important characteristic of the invention lies in the fact that these altitude values are not stored in an absolute form (compression).

To explain this, reference is made to FIGS. 7 to 9 (the words "horizontal" and "vertical" here refer to the plane of the Figure). The essential element for the definition of the altitude values is the "block" of FIG. 7. One block (identified by the indices M and N) comprises a rectangle of ME×ME elementary grids. ME is, for example, of the order of 50. The cutting down into blocks is effected so that two consecutive blocks vertically overlap over a wide column of a grid (FIG. 8) and horizontally over a tall row of a grid (FIG. 9).

According to the invention (FIG. 7), only the altitude Z11 concerning the elementary grid situated in the bottom left-hand corner of a block is stored in an absolute form, that is to say, with all its significant digits. All the other altitude values inside a block are stored in a relative mode (DELTAij), that is to say;

relative to the grid directly preceding it on the same line if this grid is in the block, or relative to the grid immediately below if its location is the left-most grid of a line.

It will be observed that there obtains a redundancy of data because of the overlapping of the blocks.

Thus FIG. 10a shows how the altitude $Z_A$ of the elementary grid $i_A$, $j_A$ in a block is determined by means of a formula (I) (see the Annex of Formulae at the end of the description).

FIG. 10b illustrates how the altitude of the same point is determined from the block situated above, in conjunction with formula (II).

FIG. 10c and formula (III) show how the altitude of the same point is again determined from the block situated on the right-hand side.

Figure 11:
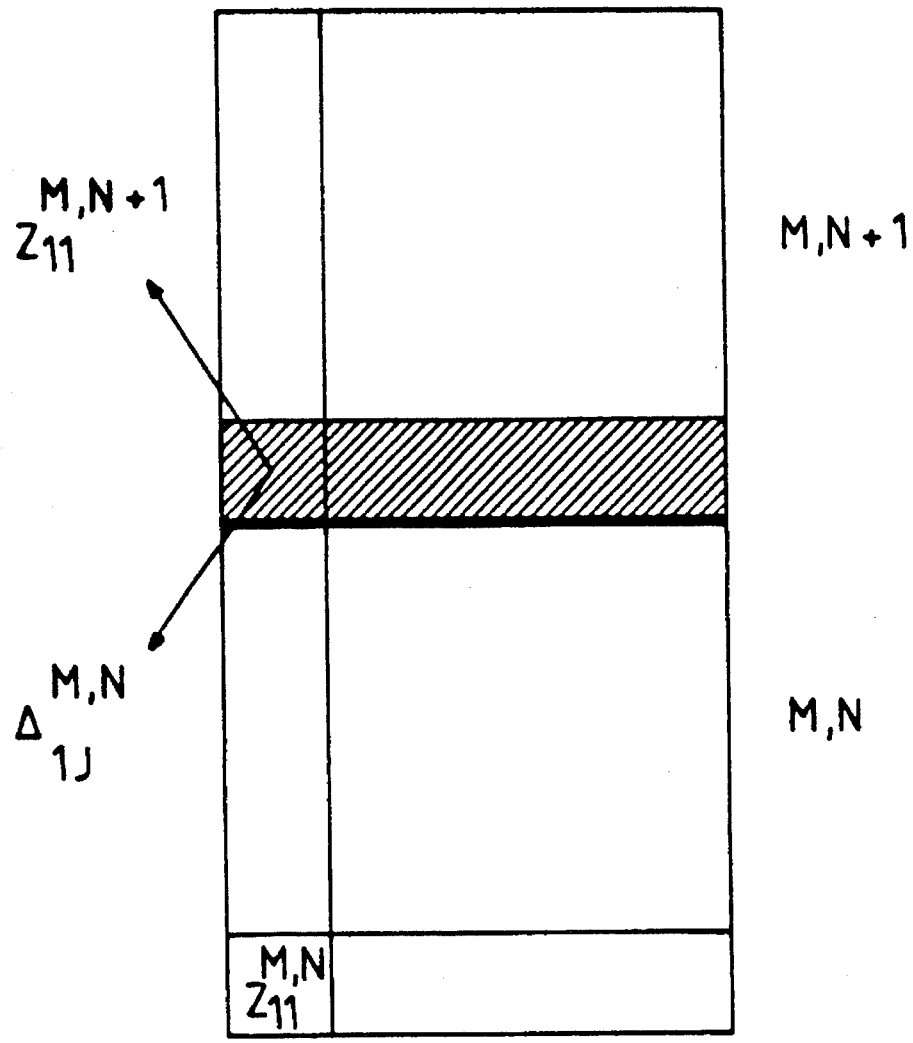
FIG. 11 and 12 illustrate the principle of a way of checking the altitude stored in the memory.
Figure 12:
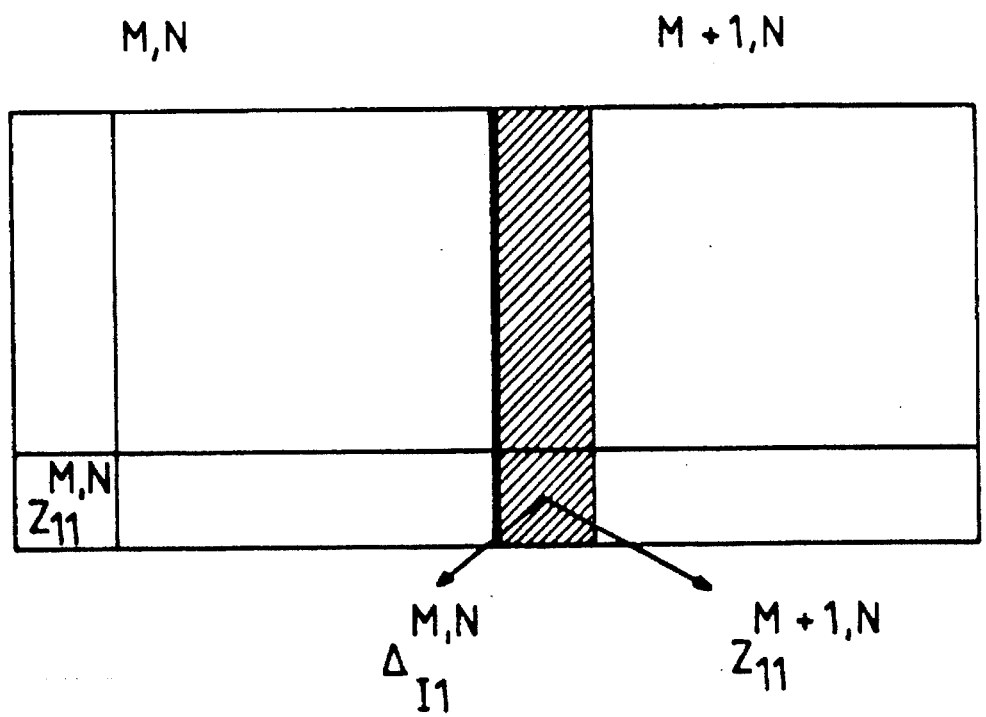

Moreover, this particularly advantageous mode of a compact representation of data permits complete checks between consecutive blocks. FIG. 11 and the formulae (IV) illustrate the vertical check between two consecutive blocks (in the overlapping row). FIG. 12 and the formulae (V) illustrate the same check but for two horizontally consecutive blocks in their overlapping column.

By storing the altitude data in the memory 30 in this way, the Applicant has observed that in the great majority of cases, each data item can be coded over four bits (at most). Moreover, it is possible to limit these data:

planar surfaces; in particular the large expanses of the seas practically do not require any coding (at the level of the grid);

one may consider effecting the relative altitude coding with an accuracy (weighting of the least significant bit or LSB) depending on the altitude, proportionately for example;

possibly, the fact will be taken into account that certain zones of the terrestrial globe are never flown over.

From Applicants' studies, it follows that it is possible to integrate the surface of the terrestrial globe, that is to say, a surface of approximately 500 million square kilometers, with the grids of higher definition provided for 1000 airports, in a memory whose total size would be 200 megabits, which can be easily achieved with the present technology.

Once these data are stored, they are complemented by an index making it possible to locate rapidly, from the data expressed in geographical coordinates, the block or blocks relating to the zone wherein the aircraft is situated, then each of the relevant elementary grids and then (if required) the grids with a higher resolution, if there are any.

The decompressing functions of the block 37 then lie in restoring in the memory 40 the absolute altitudes by means of the formulae described above (as a whole or in part, according to the degree of verification desired), taking into account any possible upgrading of the coding.

Thus the terrain file contains the altitudes of points of the terrain at the nodes of a grid of blocks and grids, with a mode of addressing or access to the data starting from the geographical coordinates of latitude (L) and longitude (G).

In the region of the poles, it suffices to effect a change of reference to return to a conventional situation, such a change of reference being practically equivalent to exchanging the poles for two opposed points of the equator, for example. This indication will enable the expert to transpose the following discussion to apply it to the case of the poles.

The uncertainties, on the one hand at the level of the flight parameters, and on the other hand, at the level of the terrain file will now be examined.

As for the flight parameters, the uncertainty depends on the equipment available on board the aircraft.

An inertial unit, even an excellent one, would have a drift of at least 10 kilometers at the end of some ten hours of flight. Applicants recommend the use of an inertial unit of good quality, suitably reset relative to position indications coming from a device such as the GPS as described with reference to FIG. 3. In these conditions, the coordinates of longitude, latitude G and L, thus obtained, are vitiated by an uncertainty which is that of the GPS equipment, that is to say, approximately 100 meters or better.

The terrain file is also subject to uncertainties.

To deal with all the uncertainties, Applicants propose to define three uncertainty margins (FIG. 13):

an uncertainty margin in latitude ML, an uncertainty margin in longitude MG, and a vertical uncertainty margin MZ.

The volume of uncertainty resulting therefrom is an ellipsoid of revolution whose half axes a, b and c are not necessarily equal (FIG. 13).

Thus as illustrated in FIG. 14, an uncertainty range is associated with each point of the flight path of the aircraft. To simplify, it is assumed that ML=MG. In the vertical projection in the horizontal plane of FIG. 14, there is then obtained an uncertainty circle of navigation CIN (an ellipse in the general case). The envelope of these circles in turn defines a flight zone ZV round the predicted flight path TVS.

It is important to note that the vertical margin MZ is the sum of:

the adjustable value MZC coming from the flight deck or the block 4, a margin linked to the uncertainties of the flight parameters as defined above, and a margin linked to the intrinsic uncertainties of the altitude of the terrain file.

In practice, the uncertainties in the two horizontal dimensions (longitude and latitude) will be finally reflected in an uncertainty in the vertical margin: indeed, these horizontal uncertainties induce an uncertainty in the "addressing" of the terrain file, hence an uncertainty in altitude.

Starting from these considerations, Applicants have observed that it was possible to carry out calculations at a renewal sequence of the order of 1 Hertz, which may be adjusted according to the velocity and the piloting transfer function of the carrier aircraft. The Hertz sequence is suitable for velocities up to approximately 275 meters per second.

It is, for example, assumed that the future flight path of the aircraft is defined by a certain number of points A to F starting from its actual position, as illustrated in Figure 15a. This future flight path is established from the current position of the aircraft (LGZ) and its velocity and acceleration vectors, associated with the respective angles defining the attitude of the aircraft. The status vector of the aircraft (position and velocity) is positioned in the trihedron of coordinates attached to the ground, wherein the BDT file is defined.

Taking into account the uncertainty range surrounding the predicted position of the aircraft (considered for the sake of simplification as a circle of radius R), and if c designates the side of the grid currently used (according to its resolution), the quantity m of grids whose altitude is to be tested is:

$$m = INT\{2*([R*SQRT(2)/c]+1)\}$$

where INT{ } designates the integral part function, and SQRT( ) the square root function. (FIGS. 17a and 17b).

At a given point, the "square surface" of uncertainty (constituted by the grids surrounding the uncertainty range) has therefore m×m grids as its maximum dimensions.

If the predicted flight path includes p points, it is then necessary to have available in the local memory 40 at least p times this surface in absolute altitudes.

Thus FIG. 16 schematically illustrates the progress of the position of the aircraft, in relation to the grids contained in the local memory.

The updating of the local memory may be effected by retaining the region wherein the aircraft is situated and by updating the three adjoining regions as illustrated in FIG. 16 by a dashed line.

With reference to FIGS. 17a and 17b, one considers the square uncertainty surface with maximum dimensions of m×m grids. All the altitudes are read and only the value of the highest altitude $Z_T$ will be retained and added to the altitude safety margin MZ defined above. The sum designated ZTM is illustrated in dashes.

The set of values ZTM on the map will give the theoretical profile beneath the aircraft, and the effect of the anti-collision law is to compare this theoretical profile beneath the aircraft with the predicted flight path of the aircraft. This mode of operating gives particular satisfaction in the case of an automatic pilot flight, because this predicted flight path is known more precisely.

In the manual mode, the flight path of the aircraft is susceptible to more important variations.

The analysis of the instantaneous and predicted situation of the aircraft may then be summed up in a set of curve tests, capable of generating two types of alarm:

a preliminary alarm indicating a dangerous configuration in the medium term, and an alarm indicating a configuration requiring immediate action from the pilot because the safety of the flight is placed in question.

For this purpose, provision is made for two curves for protecting the aircraft in relation to the terrain defined according to the same principle, but with different parameters and including (FIG. 18):

a short-term curve CCT mainly intended to avoid an accident. When a point of the terrain enters into the surface or upper envelope of the curve CCT, the pilot must intervene (alarm).

a medium term curve CMT mainly intended to forewarn the pilot that the flight path of his aircraft will encounter an obstacle if it is continued as it is and that he must consider an avoidance manoeuvre (preliminary alarm).

These curves which constitute an important element of the protection system may be elaborated from numerous static and dynamic parameters of the aircraft, in particular:

the piloting transfer function of the aircraft, that is to say, its capacity to manoeuvre, the delays $TR_o$ due to the reaction time of the pilot of the aircraft;

the horizontal velocity $V_h$ of the aircraft, the ascent velocity $V_z$ of the aircraft, the admissible load factor n.g, the height of the planned safety factor, and the rolling of the aircraft.

FIG. 19 shows an example of an absence of a false alarm. On the other hand, a case of a pertinent alarm is illustrated in FIG. 20. The small difference between these two drawings shows the difficulty of the problem solved by the invention.

Secondly, when a possible collision with the ground has been detected, the proposed device may be provided with a device for calculating an avoidance law effected in the block 48 by means of various parameters coming from the blocks 43, 46 and 40. For example, in the case of an alarm, an order is generated for the vertical disengagement of the aircraft. In general, the avoidance order will take into account in particular:

the proximity of the danger the velocity of the aircraft its "maneuverability", the pilot's reaction time, the fuel reserves.

For various reasons, Applicants consider at present that it is preferable to effect a simple avoidance manoeuvre, constituted by an avoidance order in depth making it possible to ensure over flying of the terrain (with a straightening of the aircraft if necessary).

This avoidance order may be displayed on the order director (block 53) or be treated automatically.

Thus if, for the sake of simplification, a flight path in a straight line is taken, the avoidance limit curve will be defined by three sections (FIG. 21):

from $T_0$ to $T_1$, the continuation of the flight path as it is during a time equal to the delay $RTO = T_1 - T_0$, from $T_1$ to $T_2$, a transitional period due to the change of radius of curvature of the flight path passing from infinity to the ascent radius RT, from $T_2$ to $T_3$, the avoidance flight path, proper, whose radius of curvature RT is a direct function of the square of the linear velocity of the aircraft, divided by the load factor really applied, i.e.

$$R_7 = (V_h)^2 / n.g$$

The expert knows that similar considerations make it possible to establish an avoidance manoeuvre in a turn but in a somewhat more complicated manner, into which it is here not necessary to enter into detail.

Examples of avoidance techniques are described in the French Patent Application No. 8617235 (FR-A-2607948) in the name of Applicants's assignees.

More generally, ground avoidance procedures are known which rely not only on maneuvers in the vertical plane but also maneuverers in the horizontal plane. Such devices are currently used for certain types of fast aircraft and can be easily transferred to civilian aircraft, subject to having available a suitable computing power, it being observed that the problem of civilian aircraft is far less difficult than that already dealt with in ground avoidance.

The block for generating a synthetic image (60, FIG. 4B) remains to be considered. The latter may be made in any appropriate manner, in particular in the way described in the French patent No. 82 05121 (FR-A-2524177) or its certificate of addition No. 83 16580 (FR-A-2553543) both in the name of Applicants' assignees.

The functions of the subassemblies of the block 7 have already been described in general terms. It will, first of all, be observed that this function only operates on past and present data (L, G, Z and HRS), to the exclusion of predicted values.

An example of the height of a terrain curve as provided by the memory 70 is illustrated in FIG. 22A. For its part, FIG. 22B illustrates the calculation of the height of the terrain Zta=ZA–HRS in the memory 71.

The block 72 calculates two divergences:

$\delta P1 = ZT - ZA + HRS$, and $\delta P2$, which is for example, $\delta P1$ adjusted and filtered, or any other appropriate processing of $\delta P1$.

These two divergences are compared with respective thresholds S1 and S2. FIGS. 23A and 23B illustrate the two divergences and their thresholds, to show four situations or different cases A to D.

FIG. 24 illustrates a simplified example of the mechanism for analyzing anomalies. It is assumed that the radio altimeter height HRS is valid (taking into account the indications given above).

After the starting step 7700, a test 7702 compares the absolute value of $\delta P1$ with S1. Subsequently, a test compares the absolute value of $\delta P2$ with S2 (a separate test at 7704 and 7706, according to the result of 7702, for the clarity of the drawing). One then has:

Case A (normal), if $\delta P1 \leftarrow S1$ and $\delta P2 \leftarrow S2$, in which case, one passes directly to 7780 with VAL.NAV. true.

Case B, if $\delta P1 \leftarrow S1$ and $\delta P2 > S2$. The altitude Z is shifted. Step 7712 possibly searches whether this divergence is imputable to ZA (problem noted on the on-board instruments), or to ZT (a systematic bias of the terrain file BDT). In any case, step 7740 records in the memory 79 the values L, G and $\delta P1$, (possibly the result of step 7712), and this during the whole duration of the anomaly. One nevertheless continues at 7780 with VAL.NAV. true.

Case C, if $\delta P1 > S1$ and $\delta P2 > S2$. The anomaly stems in principle from the interrogation of the terrain file BDT, either because of its addressing (the values L and/or G being vitiated by errors) or because of its contents. Normally a historical analysis will permit this to be decided (7714) according to the repetitiveness of the anomaly. In this case, step 7750 records in the memory 79 the values of L and G (possibly the result of step 7714), and this at least at the start of the anomaly. One continues with step 7785 with VAL.NAV. false.

Case D, if $\delta P1 > S1$ and $\delta P2 \leq S2$. The step 7716 may check whether this involves a pointwise anomaly by examining the hypotheses of a pointwise error of the terrain file BDT, a pointwise malfunction of one of the on-board instruments (radio altimeter, GPS, inertial unit) or a flight over a pointwise obstacle not yet entered. Here again, step 7740 records the values L, G, and $\delta P1$ in the memory 79, (possibly the results of step 7716) and this during the whole duration of the anomaly. One may continue at 7780 with VAL.NAV true. As far as the use of the history of the anomalies in steps 7712 to 7716 id concerned, its advantage will be described below in an example. It will also become apparent that the characteristics of the terrain flown over, and in particular its inherent flatness, (derived from the measurement ZA–HRS) make it possible to improve the classification of the anomalies. In the example chosen, one passes from case A with $\delta P1$ close to 0) to case C where $\delta P1$ is very perturbed. The probable causes of the anomaly can then be analyzed as follows:

if the transition from A to C is accompanied by a transition from a flat terrain to a perturbed terrain, this very probably concerns an error in the navigational parameters.

in the other cases, this very probably concerns an error in the terrain file BDT, where one will distinguish three cases of shape: the terrain remains flat; one passes from a perturbed terrain to another perturbed terrain, but with the altitude being disrupted in the transition; one passes from a perturbed terrain to a flat terrain.

An analysis of the same kind may be undertaken with other transitions between the cases A to D.

Of course, the invention is susceptible to many variants and arrangements.

For example, in the immediate vicinity of the ground, the device of the invention may have to be inhibited, at least as far as its alarms are concerned. This is the case:

when the aircraft is in the instrument landing stage (ILS), or at the pilot's express request.

The inhibition is advantageously rendered dynamic (the signal VAL.NAV. already referred to).

Moreover, it may be advantageous to use two terrain files 30, one for the relief fixed in time (natural altimetry), the other for erected and/or evolving obstacles (artificial altimetry).

ANNEX - FORMULAE $$Z_A = Z_{11} + \sum_{j=2}^{j_A} \Delta_{1j} + \sum_{i=2}^{i_A} \Delta_{ij_A} \qquad (I)$$

$$Z_A = Z_{11}^{M,N+1} - \sum_{j=j_A+1}^{J} \Delta_{1j}^{MN} + \sum_{i=2}^{i_A} \Delta_{ij_A}^{MN} \qquad (II)$$

$$Z_A = Z_{11}^{M,N+1} + \sum_{j=2}^{j_A} \Delta_{1j}^{M,N+1} - \sum_{i=i_A+1}^{I} \Delta_{ij_A}^{MN} \qquad (III)$$

$$Z_{11}^{M,N+1} = Z_{11}^{M,N} + \sum_{j=2}^{J} \Delta_{1j}^{M,N} \qquad (IV)$$

$\forall i \in \{2 \ldots I\}$ $\Delta_{i1}^{M,N+1} = \Delta_{iJ}^{M,N}$

-continued
ANNEX - FORMULAE $$Z_{11}^{M+1,N} = Z_{11}^{M,N} + \sum_{i=2}^{I} \Delta_{i1}^{M,N} \quad (V)$$

$$\forall j \in \{2 \ldots J\}$$

$$\Delta_{1j}^{M+1,N} = \Delta_{1j}^{M,N}$$

We claim:

1. In an aerial navigation aid device, the improvement comprising:

(a) mass memory means for storing a data base representing at least a substantial part of the terrestrial globe, in a cut out form comprising a grid configuration having at least one level of resolution, said grid configuration including first grids, each first grid being associated with at least one data item representing the maximum altitude inside the first grid, and at least one index permitting rapid access to sets of contiguous first grids contained in said data base in accordance with a system of addressing two horizontal coordinates;

(b) input means for receiving status indications representing the position of the aircraft with two horizontal components and the altitude, and the velocity and acceleration vectors of the aircraft, as well as control indications coming from the flight deck;

(c) a fast access working memory;

(d) management means for managing the data base, for extracting from and transferring into said fast access working memory a temporary local map in accordance with said horizontal components of the position of the aircraft, on the basis of which map there is defined an altitude envelope of the terrain in the zone wherein the aircraft is travelling; and (e) anticollision processing means:
   for processing said status indications so as to establish a plurality of predicted points of the flight path of the aircraft;
   for comparing, at each said predicted point, the contour of a protection field round the aircraft with an altitude envelope in the corresponding part of said local map; and
   for establishing an alarm if the relation between the protection field and the altitude envelope meets a first condition which is defined at least partly by said control indications.

2. A device according to claim 1, and further including means for storing a representation of the terrain as defined by on-board instruments of the aircraft in the real flight path of the aircraft, and validation means for comparing in the real flight path of the aircraft, said representation of the terrain defined by the on-board instruments with the terrain defined by the fast access working memory; means for displaying an indication regarding the matching of said fast access working memory terrain and the terrain defined by said on-board instruments; and means for generating a signal for validating the anticollision processing means.

3. A device according to claim 2, wherein the validation means include:
   a first memory relating to the terrain flown over according to the fast access working memory,
   a second memory relating to the terrain flown over according to the on-board instruments,
   means for establishing at least one deviation magnitude between said first and second memories; and
   means for comparing said at least one deviation magnitude with a threshold.

4. A device according to claim 3, wherein said validation means comprise analysis means for comparatively processing the contents of said first and second memories, said analysis means controlling said display means.

5. A device according to claim 3 wherein the validation means includes means for storing at least some of said at least one deviation magnitude.

6. A device according to claim 3, wherein said first memory stores the ground height as defined from said fast access working memory, and wherein said second memory stores the aircraft altitude and the height of the aircraft above the ground as defined from the on-board instruments.

7. A device according to claim 1, wherein said grid configuration includes, apart from the first grids, intermediate grids of higher resolution subdividing some of said first grids and ultimate grids of still higher resolution subdividing in turn some of the intermediate grids; and wherein said intermediate and ultimate grids are provided at least in the vicinity of airport zones.

8. A device according to claim 1, wherein said first grids are gathered into blocks, each block being associated with a reference altitude data item expressed as an absolute value, while the maximum altitude in each first grid is expressed as a relative value in relation to an adjoining first grid in accordance with a predetermined rule for passing through the first grids within a block; and wherein, during the loading into the fast access working memory, the relative altitudes are converted into absolute altitudes.

9. A device according to claim 8, wherein each block has an overlap of at least one first grid on two adjacent sides with its neighbors, and wherein said management means comprises means for checking the consistency of the relative altitude data between different blocks using their overlap.

10. A device according to claim 1, and further including means for validating the position data from a radionavigational instrument in relation to an inertial on-board instrument, the data thus validated serving for the prediction of the flight path of the aircraft and for addressing the fast access working memory.

11. A device according to claim 1, said control indications include the definition of an altitude safety margin; and wherein the said first condition relates to the fact that the vertical distance between the protection field and said altitude envelope is smaller than said altitude safety margin.

12. A device according to claim 1, wherein said anticollision processing means comprises means for establishing a second alarm if the relation between the protection field and the altitude envelope meets a second condition which is defined at least partly by said control indications, said second alarm indicating a medium term danger of collision.

13. A device according to claim 1, and further including means, in the case of an alarm, for establishing a desirable piloting command according to a ground avoidance law specific to the aircraft.

14. A device according to claim 13, wherein said ground avoidance law takes account of the attitude angles of the aircraft.

15. A device according to claim 14, wherein the attitude angles are derived from an inertial unit installed on-board the aircraft.

16. A device according to claim 1, wherein said first condition includes the consideration of a piloting flight path for pulling up with a virtually maximum amplitude after a brief delay.

17. A device according to claim 16 wherein said anticollision processing means comprises a means for establishing a second alarm if the relation between the protection field and the altitude envelope meets a second condition which is defined at least partly by said control indications, said second alarm indicating a medium term danger of collision; and wherein said second condition includes the consideration of another piloting flight path for pulling up with an amplitude at least as substantial as that of the first piloting flight path, after a longer delay.

18. A device according to claim 1, wherein said management means for managing the data base use a change of reference in the zones surrounding the terrestrial poles.

19. A device according to claim 1, and further including means for displaying a synthetic image of the terrain in accordance with the contents of the fast access working memory.

20. In a method for aiding aerial navigation,

A—on the ground, maintaining a data base of the terrain representing at least a substantial part of the terrestrial globe, B—on board an aircraft, B.1 providing a mass memory for storing:
   a data base extracted from the data base on the ground and representing at least a substantial part of the terrestrial globe, in a cut out form including a grid configuration on at least one level, said grid configuration including first grids, each first grid being associated with at least one data item representing the maximum altitude within the first grid, and
   at least one index permitting fast access to sets of contiguous first grids contained in said data base on-board the aircraft in accordance with an addressing system based on horizontal position coordinates, B.2—receiving from on-board instruments of said aircraft two horizontal components of the position of the aircraft, an item of vertical information, and the velocity and acceleration vectors of the aircraft, B.3—loading in accordance with two horizontal components of the position of the aircraft, a temporary local map into a fast access working memory defining an absolute altitude envelope of the terrain including a zone where the aircraft is travelling, B.4—estimating, in accordance with the position and the velocity and acceleration vectors of the aircraft, a plurality of predicted points of a flight path of the aircraft, B.5—comparing at each said predicted point the contour of a protection field surrounding the aircraft with an altitude envelope in the corresponding part of the temporary local map, and B.6—establishing an alarm if the relation between the protection field and the altitude envelope meets a first condition.

21. A method according to claim 20, and further including a validation step, said validation step comprising the substeps of:

storing a representation of the terrain as defined by on-board instruments of the aircraft in a real flight path of the aircraft, and comparing, in the real flight path of the aircraft, said representation of the terrain defined be the on-board instruments with the terrain defined by the fast access working memory.

22. A method according to claim 21, wherein the validation step further includes the substep of storing divergences revealed by said comparing substep, and wherein the step A includes the updating of the data base on the ground from at least some of the stored divergences.

23. A method according to claim 20, wherein the grid configuration of step B.1 includes, apart from the first grids, intermediate grids subdividing certain of the first grids, and ultimate grids subdividing in turn certain of the intermediate grids, said intermediate grids and ultimate grids being provided at least in the vicinity of airport zones.

24. A method according to claim 20, wherein in step B.1, the first grids are gathered into blocks, each block being associated with a reference altitude data item expressed as an absolute value, while the maximum altitude in each first grid is expressed as a relative value in relation to an adjoining first grid in accordance with a predetermined rule for passing through the first grids within a block; and wherein step B.3 comprises converting the relative altitudes into absolute altitudes.

25. A method according to claim 20, wherein the step B.2 includes the validation of the position data from a radionavigational instrument in relation to position data from an on-board inertial instrument, and wherein the data thus validated is utilized in steps B.3 and B.4.

26. A method according to claim 20, and further including, in the case of an alarm, the establishment of an avoidance order in accordance with a ground avoidance law specific to the aircraft.

* * * * *